(12) United States Patent
Sano et al.

(10) Patent No.: US 12,510,638 B2
(45) Date of Patent: Dec. 30, 2025

(54) DISTANCE MEASURING DEVICE, METHOD FOR CONTROLLING DISTANCE MEASURING DEVICE, AND ELECTRONIC DEVICE

(71) Applicant: SONY SEMICONDUCTOR SOLUTIONS CORPORATION, Kanagawa (JP)

(72) Inventors: Hironaga Sano, Kanagawa (JP); Yasuhiro Okamoto, Kanagawa (JP); Hiroaki Ono, Kanagawa (JP); Yukinao Kenjo, Kanagawa (JP); Takashi Kusakari, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1086 days.

(21) Appl. No.: 17/430,653

(22) PCT Filed: Feb. 14, 2020

(86) PCT No.: PCT/JP2020/005818
§ 371 (c)(1),
(2) Date: Aug. 12, 2021

(87) PCT Pub. No.: WO2020/170969
PCT Pub. Date: Aug. 27, 2020

(65) Prior Publication Data
US 2022/0146648 A1 May 12, 2022

(30) Foreign Application Priority Data

Feb. 22, 2019 (JP) .................................. 2019-030134
Sep. 25, 2019 (JP) .................................. 2019-173702

(51) Int. Cl.
*G01S 7/486* (2020.01)
*G01S 17/89* (2020.01)
(Continued)

(52) U.S. Cl.
CPC ............ *G01S 7/4868* (2013.01); *G01S 17/89* (2013.01); *G06T 7/521* (2017.01); *H04N 23/72* (2023.01); *G06T 2207/10028* (2013.01)

(58) Field of Classification Search
CPC ...... G01S 7/4868; G01S 17/89; G01S 17/894; G06T 7/521; G06T 2207/10028;
(Continued)

(56) References Cited

U.S. PATENT DOCUMENTS

2012/0177252 A1\* 7/2012 Korekado ............. G01S 17/894
382/106
2016/0320486 A1 11/2016 Murai et al.
(Continued)

FOREIGN PATENT DOCUMENTS

CN 110249236 A 9/2019
JP 2004-294420 A 10/2004
(Continued)

OTHER PUBLICATIONS

International Search Report and Written Opinion of PCT Application No. PCT/JP2020/005818, issued on May 12, 2020, 08 pages of ISRWO.

*Primary Examiner* — Luke D Ratcliffe
*Assistant Examiner* — Joseph C Fritchman
(74) *Attorney, Agent, or Firm* — CHIP LAW GROUP

(57) ABSTRACT

A distance measuring device of the present disclosure includes: a light source that irradiates a subject with light; a light detection unit that receives reflected light from the subject based on irradiation light from the light source; and a control unit that performs exposure control according to a
(Continued)

distance between the distance measuring device and the subject. Furthermore, an electronic device of the present disclosure includes the distance measuring device having the configuration described above.

12 Claims, 23 Drawing Sheets

(51) Int. Cl.
*G06T 7/521* (2017.01)
*H04N 23/72* (2023.01)

(58) Field of Classification Search
CPC .......... H04N 23/72; H04N 23/74; G01C 3/06; G02B 7/40; G03B 7/093; G03B 13/36
See application file for complete search history.

(56) References Cited

U.S. PATENT DOCUMENTS

| | | | |
|---|---|---|---|
| 2018/0224545 A1 | 8/2018 | Price et al. | |
| 2020/0249354 A1* | 8/2020 | Yeruhami | G01S 17/58 |

FOREIGN PATENT DOCUMENTS

| | | |
|---|---|---|
| JP | 2010-025906 A | 2/2010 |
| JP | 2011-064498 A | 3/2011 |
| WO | 2015/107869 A1 | 7/2015 |

* cited by examiner

DISTANCE MEASURING DEVICE, METHOD FOR CONTROLLING DISTANCE MEASURING DEVICE, AND ELECTRONIC DEVICE

CROSS REFERENCE TO RELATED APPLICATIONS

This application is a U.S. National Phase of International Patent Application No. PCT/JP2020/005818 filed on Feb. 14, 2020, which claims priority benefit of Japanese Patent Application No. JP 2019-030134 filed in the Japan Patent Office on Feb. 22, 2019 and also claims priority benefit of Japanese Patent Application No JP 2019-173702 filed in the Japan Patent Office on Sep. 25, 2019 Each of the above-referenced applications is hereby incorporated herein by reference in its entirety.

TECHNICAL FIELD

The present disclosure relates to a distance measuring device, a method for controlling the distance measuring device, and an electronic device.

BACKGROUND ART

As a distance measuring device (distance measuring device) that acquires distance information (distance image information) to a subject, there is a device (sensor) using a time of flight (ToF) method (see, for example, Patent Document 1). The ToF method is a method for measuring a distance to a subject (measuring object) by irradiating the subject with light from a light source and detecting a flight time of the light until the irradiation light is reflected by the subject and returns to a light detection unit.

CITATION LIST

Patent Document

Patent Document 1: Japanese Patent Application Laid-Open No. 2004-294420

SUMMARY OF THE INVENTION

Problems to be Solved by the Invention

In the distance measuring device of the ToF method, automatic exposure (AE) control of the light source is performed. In this AE control, in order to acquire a high-quality distance image (depth map), control is performed so that a maximum confidence value (Confidence) level can be acquired within a range not exceeding a saturation threshold with the saturation threshold as a target.

However, due to an allowable limit of power consumption, a setting limit of laser output intensity of the light source, and the like, all sections of a distance measuring range cannot be irradiated with the light from the light source, and for example, exposure variation by the automatic exposure control occurs only in a part of a short distance section.

Therefore, an object of the present disclosure is to provide a distance measuring device, a method for controlling the distance measuring device, and an electronic device including the distance measuring device, in which a wider section of a distance measuring range is sufficiently irradiated with light from a light source and exposure variation by automatic exposure control occurs over the wider section of the distance measuring range.

Solutions to Problems

A distance measuring device of the present disclosure for achieving the object described above includes:
a light source that irradiates a subject with light;
a light detection unit that receives reflected light from the subject based on irradiation light from the light source; and
a control unit that performs exposure control according to a distance between the distance measuring device and the subject.
A method for controlling a distance measuring device of the present disclosure for achieving the object described above,
in which upon control of the distance measuring device including
a light source that irradiates a subject with light, and
a light detection unit that receives reflected light from the subject based on irradiation light from the light source,
exposure control is performed according to a distance between the distance measuring device and the subject. Furthermore, an electronic device of the present disclosure for achieving the object described above includes the distance measuring device having the configuration described above.

MODE FOR CARRYING OUT THE INVENTION

Figure 1:
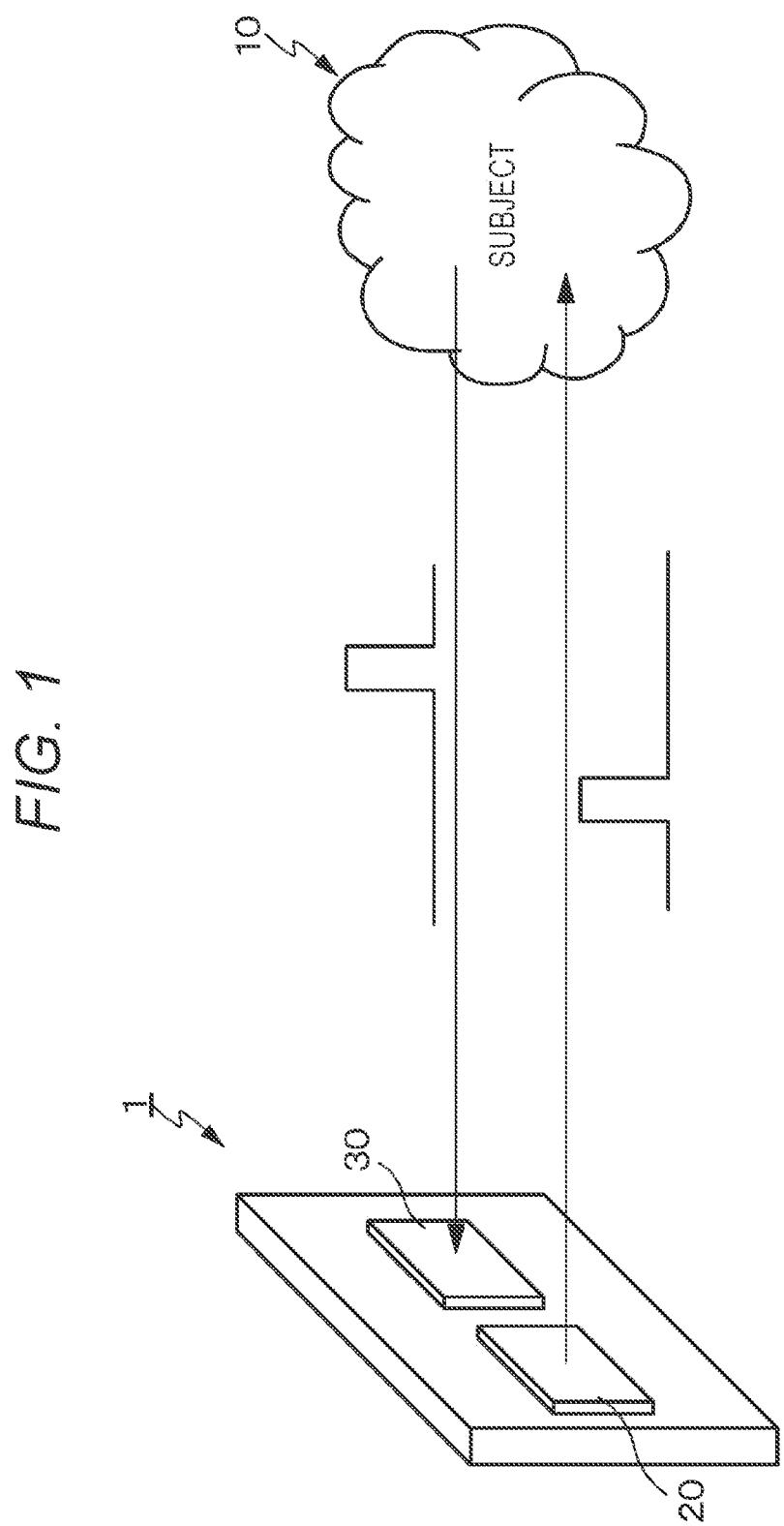
FIG. 1 is a conceptual diagram of a distance measuring system of a ToF method.

Hereinafter, modes for carrying out technology of the present disclosure (hereinafter described as "embodiments") will be described in detail with reference to the drawings. The present disclosure is not limited to the embodiments, and various numerical values and the like in the embodiments are examples. In the following description, the same elements or elements having the same functions are denoted by the same reference symbols, without redundant description. Note that the description will be given in the following order.

1. Description of distance measuring device and electronic device in general of the present disclosure
2. Distance measuring system of ToF method
3. Distance measuring device to which technology of the present disclosure is applied
   3-1. System configuration
   3-2. Configuration example of light detection unit
   3-3. Circuit configuration example of pixel
4. About dynamic of distance and confidence value (Confidence)
5. AE control according to conventional example
6. AE control according to first embodiment (examples of AE control in distant view, near view, and ultra-near view)
   6-1. About calculation processing of exposure time
   6-2. About mechanism of AE control according to distance
   6-3. About specific processing flow of AE control
   6-4. About control of light emission/exposure conditions
7. AE control according to second embodiment (modified example of AE control in ultra-near view)
8. Modified example
9. Application example
10. Electronic device of the present disclosure (example of smartphone)
11. Configuration that can be taken by the present disclosure <Description of Distance Measuring Device and Electronic Device in General of the Present Disclosure>

In a distance measuring device and an electronic device of the present disclosure, a control unit can be configured to perform exposure control on the basis of a signal value output from a light detection unit. Furthermore, the control unit can be configured to control light emission/exposure conditions of a next frame on the basis of imaging data and light emission/exposure conditions of a current frame output from the light detection unit.

In the distance measuring device and the electronic device of the present disclosure including the preferable configuration described above, the control unit can be configured to perform the exposure control so as to maintain a designated first confidence value in control of a relatively distant view. Furthermore, the control unit can be configured to perform the exposure control so as to maintain a designated exposure time in control of a relatively near view.

Furthermore, in the distance measuring device and the electronic device of the present disclosure including the preferable configuration described above, the control unit can be configured to separate an ambient light component incident on the light detection unit and a reflected light component from a subject and to control the reflected light component.

Furthermore, the control unit can be configured to estimate the ambient light component on the basis of image data output from a light detector and to separate the reflected light component and the ambient light component.

Furthermore, in the distance measuring device and the electronic device of the present disclosure including the preferable configuration described above, the control unit can be configured to adaptively control an amount of noise of the reflected light component with reference to the signal value output from the light detection unit.

Furthermore, the distance measuring device and the electronic device of the present disclosure including the above-described preferable configuration can include a distance measuring unit that performs processing of acquiring a distance image using image data of a current frame including distance information detected for each pixel of the light detection unit.

Furthermore, in the distance measuring device and the electronic device of the present disclosure including the above-described preferable configuration, the control unit can be configured to perform the exposure control so as to maintain a designated second confidence value in control of a relatively ultra-near view. For the ultra-near view, a distance to the subject (that is, a distance between the distance measuring device and the subject) can be set to a short distance so that influence of scattered light occurs due to presence of a subject which is not a distance measuring object.

<Distance Measuring System of ToF Method>

FIG. 1 is a conceptual diagram of a distance measuring system of a ToF method. In a distance measuring device 1 according to the present example, the ToF method is adopted as a measuring method for measuring a distance to a subject 10 as a measuring object. The ToF method is a method for measuring a time until light, with which the subject 10 has been irradiated, is reflected by the subject 10 and returns. In order to implement distance measurement by the ToF method, the distance measuring device 1 includes a light source 20 that emits light (for example, laser light having a peak wavelength in an infrared wavelength area) with which the subject 10 is irradiated, and a light detection unit 30 that detects reflected light reflected by the subject 10 and returning.

<Distance Measuring Device to which Technology of the Present Disclosure is Applied>
[System Configuration]

Figure 2:
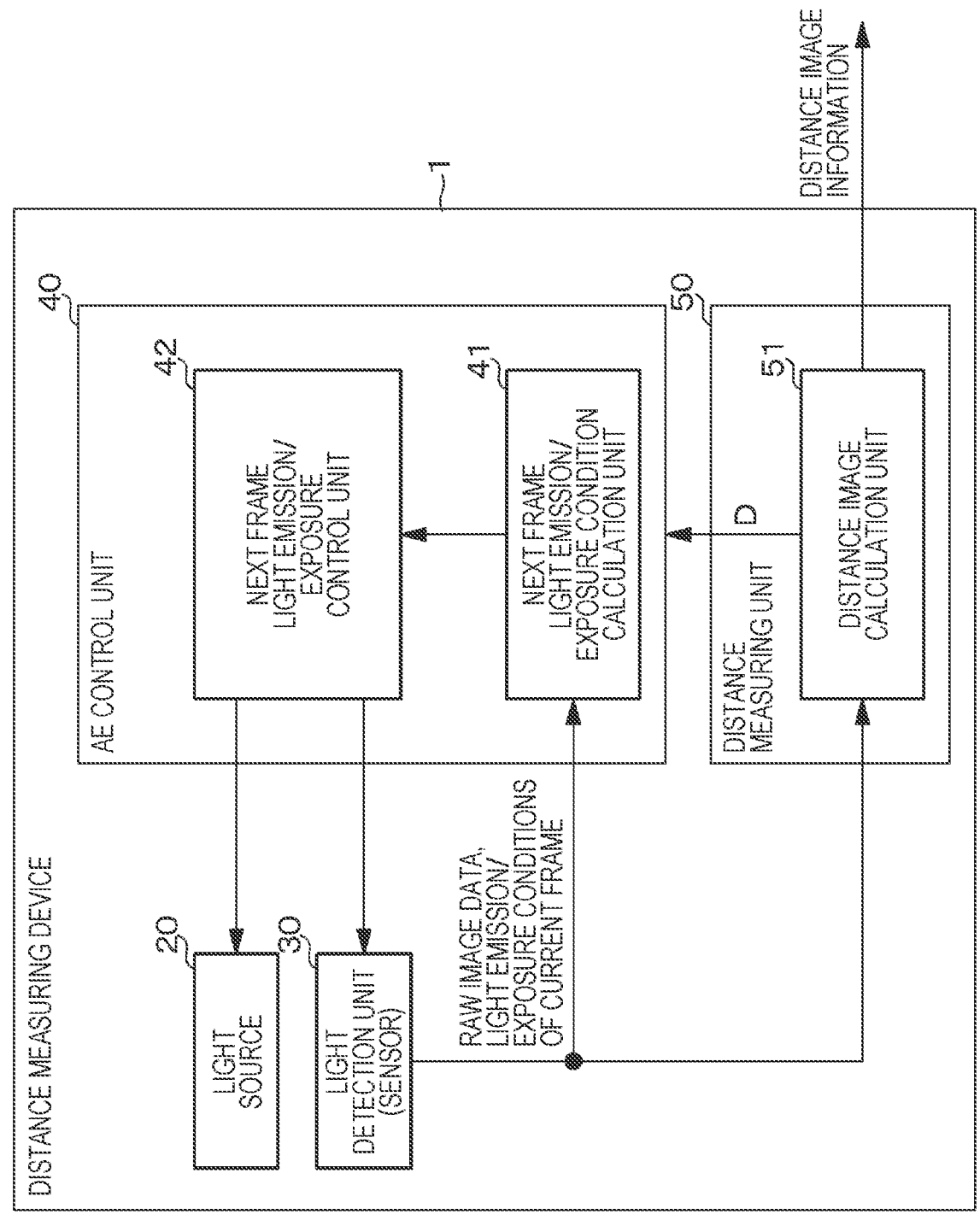
FIG. 2 is a block diagram illustrating an example of a configuration of a distance measuring device of a ToF method to which technology of the present disclosure is applied.

FIG. 2 is a block diagram illustrating an example of a configuration of the distance measuring device of the ToF method to which technology of the present disclosure is applied. The distance measuring device 1 according to the present application example (that is, the distance measuring device 1 of the present disclosure) includes, in addition to the light source 20 and the light detection unit 30, an AE control unit 40 that performs exposure control on the basis of a signal value output from the light detection unit 30 and a distance measuring unit 50. Then, the distance measuring device 1 of the ToF method according to the present application example can detect distance information for each pixel of the light detection unit 30 and acquire a highly accurate distance image (depth map) in units of imaging frames.

The distance measuring device 1 according to the present application example is a distance image sensor of an indirect ToF method that measures a distance from the distance measuring device 1 to a measuring object (subject) by reflecting light emitted from the light source 20 by the measuring object and measuring a light flight time on the basis of detection of an arrival phase difference of the reflected light to the light detection unit 30.

Under the control of the AE control unit 40, the light source 20 repeats an on/off operation at a predetermined cycle to irradiate a measuring object with light. As irradiation light of the light source 20, for example, near infrared light near 850 nm is often used. The light detection unit 30 receives light that returns after the irradiation light from the light source 20 is reflected by the measuring object, and detects distance information for each pixel. From the light detection unit 30, RAW image data and light emission/exposure setting information of a current frame including the distance information detected for each pixel are output and supplied to the AE control unit 40 and the distance measuring unit 50.

The AE control unit 40 includes a next frame light emission/exposure condition calculation unit 41 and a next frame light emission/exposure control unit 42. The next frame light emission/exposure condition calculation unit 41 calculates light emission/exposure conditions of a next frame on the basis of the RAW image data and the light emission/exposure setting information of the current frame supplied from the light detection unit 30. The light emission/exposure conditions of the next frame are a light emission time and light emission intensity of the light source 20 and an exposure time of the light detection unit 30 in acquisition of a distance image of the next frame. The next frame light emission/exposure control unit 42 controls the light emission time and the light emission intensity of the light source 20 and the exposure time of the light detection unit 30 of the next frame on the basis of the light emission/exposure conditions of the next frame calculated by the next frame light emission/exposure condition calculation unit 41.

The distance measuring unit 50 includes a distance image calculation unit 51 that calculates a distance image. The distance image calculation unit 51 calculates a distance image by performing calculation using the RAW image data of the current frame including the distance information detected for each pixel of the light detection unit 30, and outputs the distance image to the outside of the distance measuring device 1 as distance image information including depth information as depth information and confidence value information as light reception information. Here, the distance image is, for example, an image in which a distance value (depth/depth value) based on the distance information detected for each pixel is reflected in each pixel.

[Configuration Example of Light Detection Unit]

Figure 3:
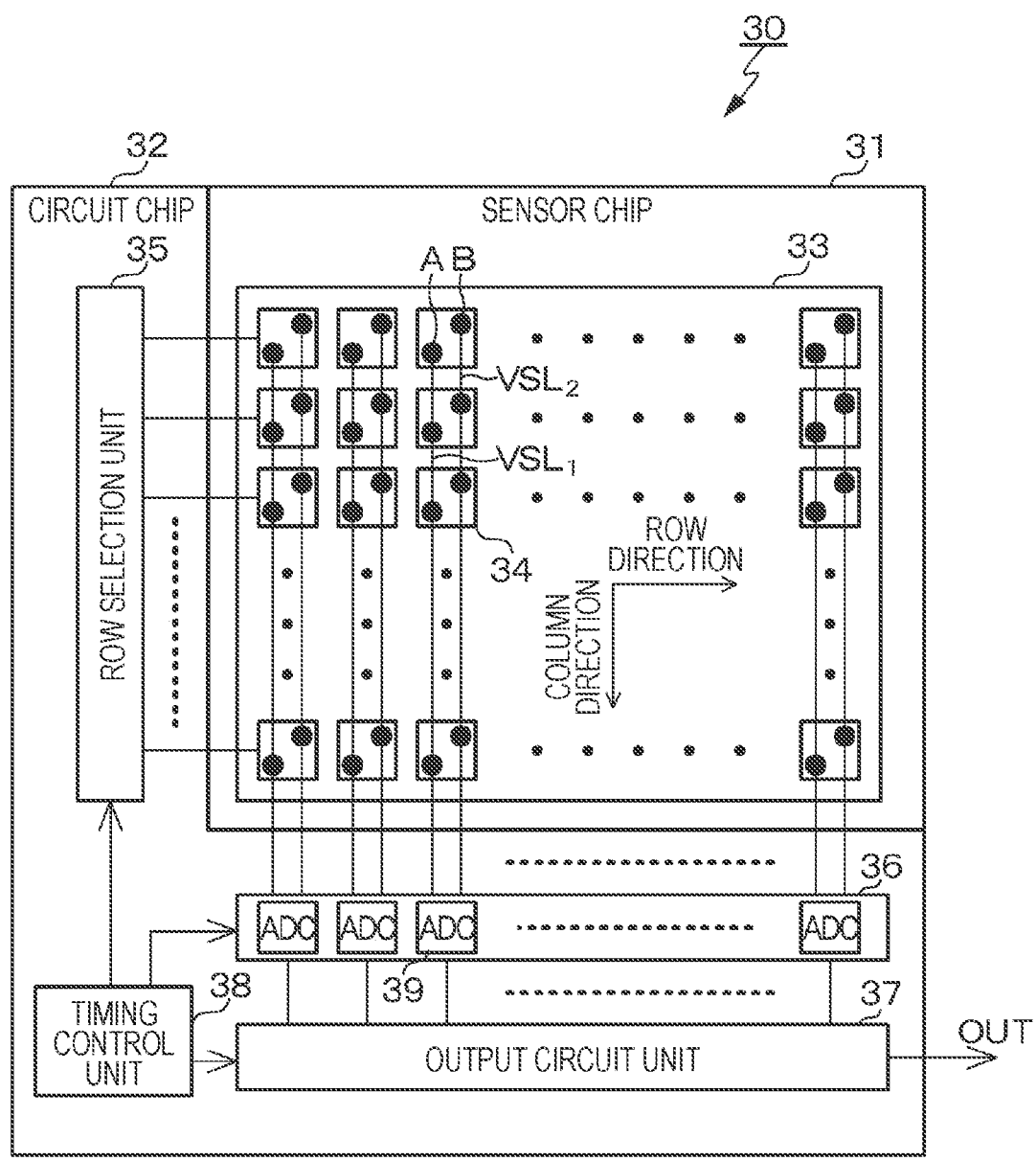
FIG. 3 is a block diagram illustrating an example of a configuration of a light detection unit.

Here, a specific configuration example of the light detection unit 30 will be described with reference to FIG. 3. FIG. 3 is a block diagram illustrating an example of a configuration of the light detection unit 30.

The light detection unit 30 has a stacked structure including a sensor chip 31 and a circuit chip 32 stacked on the sensor chip 31. In this stacked structure, the sensor chip 31 and the circuit chip 32 are electrically connected through a connection portion such as a via (VIA) or Cu—Cu bonding (not illustrated). Note that FIG. 3 illustrates a state in which wiring of the sensor chip 31 and wiring of the circuit chip 32 are electrically connected via the connection portion described above.

A pixel array unit 33 is formed on the sensor chip 31. The pixel array unit 33 includes a plurality of pixels 34 arranged in a matrix shape (an array shape) in a two-dimensional grid pattern on the sensor chip 31. In the pixel array unit 33, each of the plurality of pixels 34 receives incident light (for example, near infrared light), performs photoelectric conversion, and outputs an analog pixel signal. In the pixel array unit 33, two vertical signal lines $VSL_1$ and $VSL_2$ are wired for each pixel column. Assuming that the number of pixel columns of the pixel array unit 33 is M (M is an integer), (2×M) vertical signal lines VSL in total are wired in the pixel array unit 33.

Each of the plurality of pixels 34 has a first tap A and a second tap B (details thereof will be described later). An analog pixel signal $AIN_{P1}$ based on charge of the first tap A of the pixel 34 in the corresponding pixel column is output to the vertical signal line $VSL_1$, of the two vertical signal lines $VSL_1$ and $VSL_2$. Furthermore, an analog pixel signal $AIN_{P2}$ based on charge of the second tap B of the pixel 34 in the corresponding pixel column is output to the vertical signal line $VSL_2$. The analog pixel signals $AIN_{P1}$ and $AIN_{P2}$ will be described later.

On the circuit chip 32, a row selection unit 35, a column signal processing unit 36, an output circuit unit 37, and a timing control unit 38 are disposed. The row selection unit 35 drives each pixel 34 of the pixel array unit 33 in units of pixel rows and causes the pixel signals $AIN_{P1}$ and $AIN_{P2}$ to be output. Under driving by the row selection unit 35, the analog pixel signals $AIN_{P1}$ and $AIN_{P2}$ output from the pixel 34 in the selected row are supplied to the column signal processing unit 36 through the two vertical signal lines $VSL_1$ and $VSL_2$.

The column signal processing unit 36 includes, for example, a plurality of analog-digital converters (ADC) 39 provided for each pixel column corresponding to the pixel column of the pixel array unit 33. The analog-digital converter 39 performs analog-digital conversion processing on the analog pixel signals $AIN_{P1}$ and $AIN_{P2}$ supplied through the vertical signal lines $VSL_1$ and $VSL_2$, and outputs the processed signals to the output circuit unit 37. The output circuit unit 37 performs correlated double sampling (CDS) processing or the like on the digitized pixel signals $AIN_{P1}$ and $AIN_{P2}$ output from the column signal processing unit 36, and outputs the pixel signals to the outside of the circuit chip 32.

The timing control unit 38 generates various timing signals, clock signals, control signals, and the like, and performs drive control of the row selection unit 35, the column signal processing unit 36, the output circuit unit 37, and the like on the basis of these signals.

[Circuit Configuration Example of Pixel]

Figure 4:
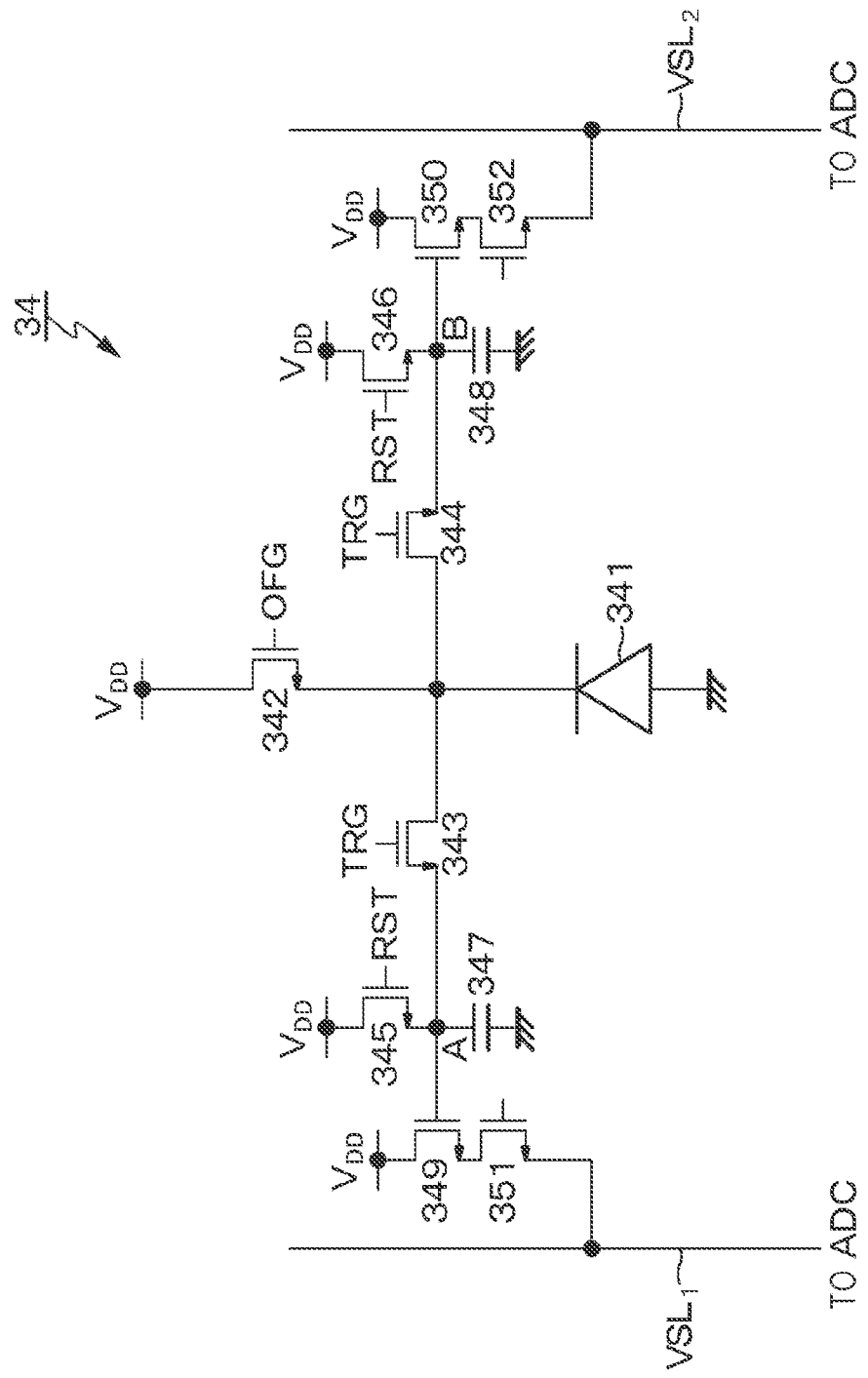
FIG. 4 is a circuit diagram illustrating an example of a circuit configuration of a pixel in the light detection unit.

FIG. 4 is a circuit diagram illustrating an example of a circuit configuration of the pixel 34 in the light detection unit 30.

The pixel 34 according to the present example includes, for example, a photodiode 341 as a photoelectric conversion unit. In addition to the photodiode 341, the pixel 34 includes an overflow transistor 342, two transfer transistors 343 and 344, two reset transistors 345 and 346, two floating diffusion layers 347 and 348, two amplification transistors 349 and 350, and two selection transistors 351 and 352. The two floating diffusion layers 347 and 348 correspond to the first and second taps A and B (hereinafter may be simply described as "taps A and B") illustrated in FIG. 3 described above.

The photodiode 341 photoelectrically converts received light to generate charge. The photodiode 341 can have, for example, a back irradiation-type pixel structure that captures light emitted from a back side of a substrate. However, the pixel structure is not limited to the back irradiation-type pixel structure, and may be a front irradiation-type pixel structure that captures light emitted from a front side of the substrate.

The overflow transistor 342 is connected between a cathode electrode of the photodiode 341 and a power supply line of a power supply voltage $V_{DD}$, and has a function of resetting the photodiode 341. Specifically, the overflow transistor 342 becomes conductive in response to an overflow gate signal OFG supplied from the row selection unit 35, thereby sequentially discharging the charge of the photodiode 341 to the power supply line of the power supply voltage $V_{DD}$.

The two transfer transistors 343 and 344 are connected between the cathode electrode of the photodiode 341 and the respective two floating diffusion layers 347 and 348 (taps A and B). Then, the transfer transistor 343, 344 becomes conductive in response to a transfer signal TRG supplied from the row selection unit 35, thereby sequentially transferring the charge generated by the photodiode 341 to the floating diffusion layer 347, 348.

The floating diffusion layer 347, 348 corresponding to the first or second tap A, B accumulates the charge transferred from the photodiode 341, converts the charge into a voltage signal having a voltage value corresponding to a charge amount, and generates an analog pixel signal $AIN_{P1}$, $AIN_{P2}$.

The two reset transistors 345 and 346 are connected between the respective two floating diffusion layers 347 and 348 and a power supply line of a power supply voltage $V_{DD}$. Then, the reset transistor 345, 346 becomes conductive in response to a reset signal RST supplied from the row selection unit 35, thereby extracting the charge from the floating diffusion layer 347, 348 and initializing the charge amount.

The two amplification transistors 349 and 350 are connected between a power supply line of a power supply voltage $V_{DD}$ and the respective two selection transistors 351 and 352, and each amplify a voltage signal converted from the charge to the voltage in the floating diffusion layer 347, 348.

The two selection transistors 351 and 352 are connected between the respective two amplification transistors 349 and 350 and the respective vertical signal lines $VSL_1$ and $VSL_2$.

Then, the selection transistors 351 and 352 become conductive in response to selection signals SEL supplied from the row selection unit 35, thereby outputting the voltage signals amplified by the amplification transistors 349 and 350 to the two vertical signal lines $VSL_1$ and $VSL_2$ as the analog pixel signals $AIN_{P1}$ and $AIN_{P2}$, respectively.

The two vertical signal lines $VSL_1$ and $VSL_2$ are connected to input ends of one analog-digital converter 39 in the column signal processing unit 36 for each pixel column, and transmit the analog pixel signals $AIN_{P1}$ and $AIN_{P2}$ output from the pixels 34 for each pixel column to the analog-digital converter 39.

Note that the circuit configuration of the pixel 34 is not limited to the circuit configuration illustrated in FIG. 3 as long as the circuit configuration can generate the analog pixel signals $AIN_{P1}$ and $AIN_{P2}$ by photoelectric conversion.

Figure 5:
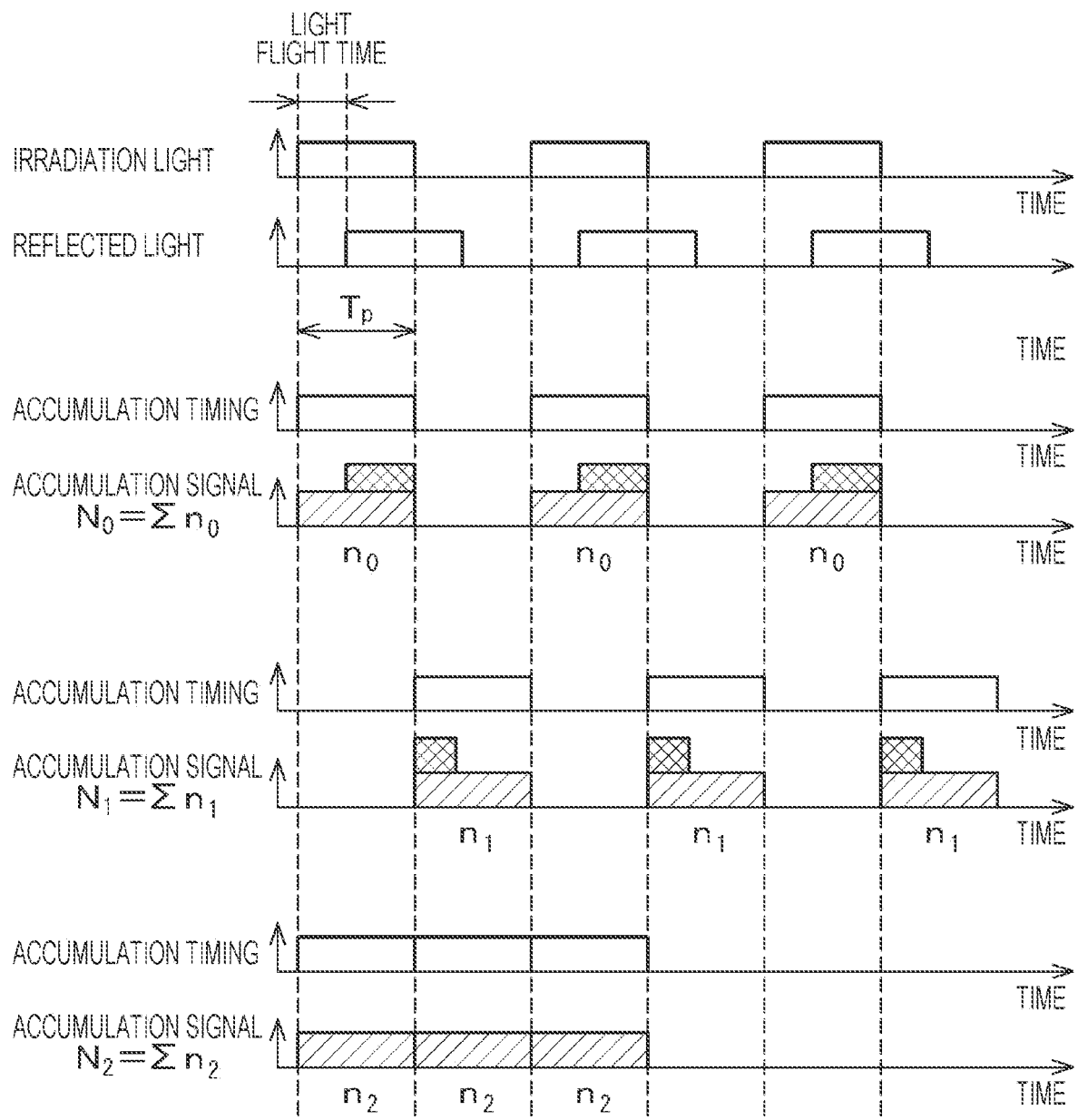
FIG. 5 is a timing waveform chart for explaining calculation of a distance in the distance measuring device of the ToF method.

Here, calculation of a distance by the ToF method will be described with reference to FIG. 5. FIG. 5 is a timing waveform chart for explaining calculation of a distance in the distance measuring device 1 of the ToF method. The light source 20 and the light detection unit 30 in the distance measuring device 1 of the ToF method operate at timing illustrated in the timing waveform chart of FIG. 5.

The light source 20 irradiates a measuring object with light for a predetermined period, for example, a period of a pulse light emission time $T_p$ under the control of the AE control unit 40. The irradiation light emitted from the light source 20 is reflected by the measuring object and returns. This reflected light (active light) is received by the photodiode 341. A time during which the photodiode 341 receives the reflected light after the irradiation of the measuring object with the irradiation light is started, that is, a light flight time, is a time corresponding to a distance from the distance measuring device 1 to the measuring object.

In FIG. 4, the photodiode 341 receives the reflected light from the measuring object only during the period of the pulse light emission time $T_p$ from a time point at which the irradiation with the irradiation light is started. At this time, the light received by the photodiode 341 includes ambient light (ambient light) reflected/scattered by an object, the atmosphere, or the like, in addition to the reflected light (active light) returned after the light, with which the measuring object has been irradiated, is reflected by the measuring object.

At the time of one light reception, charge photoelectrically converted by the photodiode 341 is transferred to and accumulated in the tap A (floating diffusion layer 347). Then, a signal $n_0$ of a voltage value corresponding to a charge amount accumulated in the floating diffusion layer 347 is acquired from the tap A. At a time point when accumulation timing of the tap A ends, the charge photoelectrically converted by the photodiode 341 is transferred to and accumulated in the tap B (floating diffusion layer 348). Then, a signal $n_1$ of a voltage value corresponding to a charge amount accumulated in the floating diffusion layer 348 is acquired from the tap B.

As described above, driving in which phases of the accumulation timings are made different from each other by 180 degrees (driving in which the phases are completely reversed) is performed on the tap A and the tap B, so that the signal $n_0$ and the signal $n_1$ are acquired, respectively. Then, such driving is repeated a plurality of times, and accumulation and integration of the signal $n_0$ and the signal $n_1$ are performed, so that an accumulation signal $N_0$ and an accumulation signal $N_1$ are acquired.

For example, for one pixel 34, light reception is performed twice in one phase, and signals of four times, that is, 0 degrees, 90 degrees, 180 degrees, and 270 degrees are accumulated in each of the tap A and the tap B. A distance D from the distance measuring device 1 to the measuring object is calculated on the basis of the accumulation signal $N_0$ and the accumulation signal $N_1$ acquired in this manner.

The accumulation signal $N_0$ and the accumulation signal $N_1$ include not only a component of the reflected light (active light) reflected by the measuring object and returned, but also a component of the ambient light (ambient light) reflected/scattered by an object, the atmosphere, or the like. Therefore, in the operation described above, in order to remove influence of the component of the ambient light (ambient light) and leave the component of the reflected light (active light), a signal $n_2$ based on the ambient light is also accumulated and integrated, and an accumulation signal $N_2$ for the ambient light component is acquired.

Using the accumulation signal $N_0$ and the accumulation signal $N_1$ including the ambient light component and the accumulation signal $N_2$ for the ambient light component acquired in this manner, the distance D from the distance measuring device 1 to the measuring object can be calculated by arithmetic processing based on the following equations (1) and (2).

$$\Delta\phi = \frac{N_0 - N_2}{N_0 + N_1 - 2 \cdot N_2} \quad (1)$$

$$D = \frac{c \cdot T_p}{2}\left(1 - \frac{\Delta\phi}{2\pi}\right) \quad (2)$$

In the equations (1) and (2), D represents the distance from the distance measuring device 1 to the measuring object, c represents speed of light, and $T_p$ represents the pulse light emission time.

Using the accumulation signal $N_0$ and the accumulation signal $N_1$ including the ambient light component and the accumulation signal $N_2$ for the ambient light component, the distance image calculation unit 51 illustrated in FIG. 2 calculates the distance D from the distance measuring device 1 to the measuring object by the arithmetic processing based on the above equations (1) and (2) output from the light detection unit 30, and outputs the distance D as distance image information. As the distance image information, for example, image information colored with color having density corresponding to the distance D can be exemplified. Note that, although the calculated distance D is output as the distance image information here, the calculated distance D may be output as it is as distance information. The information of the distance D calculated by the distance image calculation unit 51 is also supplied to the AE control unit 40.

<About Dynamic of Distance and Confidence Value (Confidence)>

Figure 6:
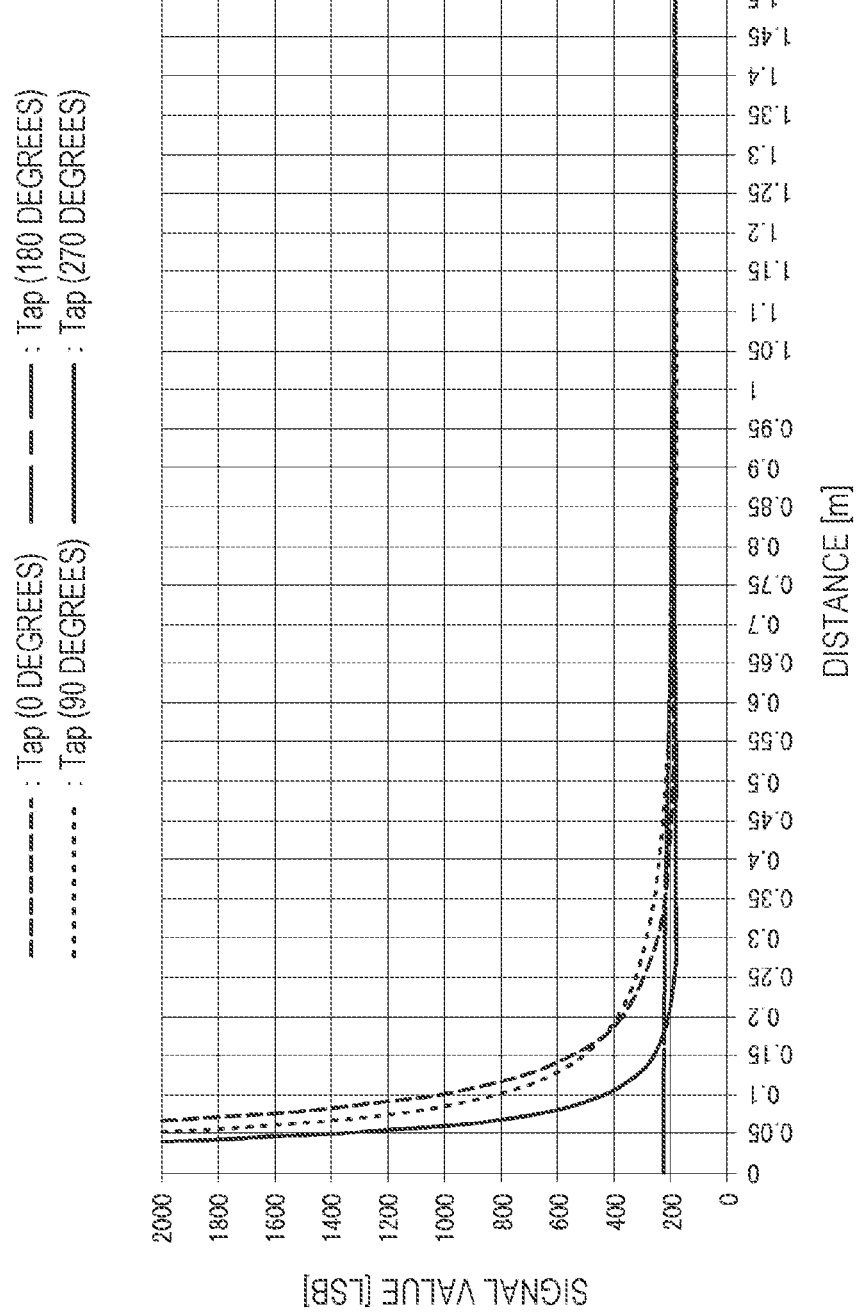
FIG. 6 is a characteristic diagram illustrating a relationship between a signal value of the light detection unit and a distance in a distance measuring device according to a first embodiment.

Incidentally, it is known that light intensity from a point light source attenuates in inverse proportion to the square of a distance from the point light source. In the distance measuring device 1 according to the present embodiment, FIG. 6 illustrates a relationship between a signal value of the light detection unit 30 and a distance in cases of signals of 0 degrees, 90 degrees, 180 degrees, and 270 degrees accumulated in the tap A and the tap B. In FIG. 6, a broken line represents a case of the signal of 0 degrees, a dotted line represents a case of the signal of 90 degrees, a dashed line represents a case of the signal of 180 degrees, and a solid line represents a case of the signal of 270 degrees. As is clear from this characteristic diagram, it can be seen that the signal value of the light detection unit 30 based on the light intensity attenuates in inverse proportion to the square of the distance.

In a simple model, the signal value is expressed by the following equation.

Signal value=amplitude of light emitting source×
exposure time(=light emission time)×reflectance
of subject×constant Here, the constant is another conversion coefficient (other than the amplitude of the light emitting source, the exposure time, and the reflectance of the subject).

However, the exposure time as an AE control target and the signal value have a linear relationship.

Figure 7:
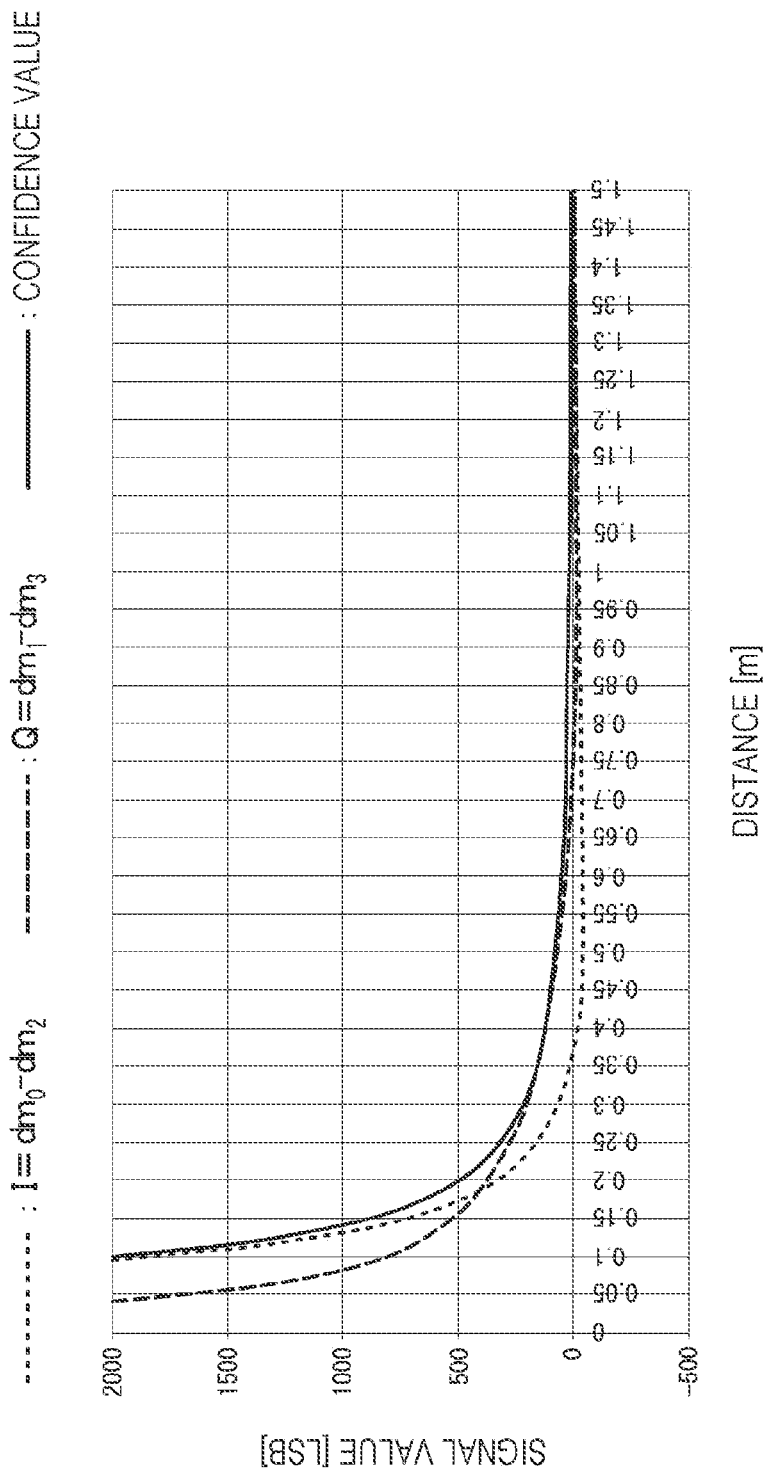
FIG. 7 is a characteristic diagram illustrating a relationship between a signal value and a distance for a confidence value of an IQ plane.

FIG. 7 illustrates a relationship between a signal value and a distance for a confidence value (Confidence) of an IQ plane created by calculation from the signals of 0 degrees, 90 degrees, 180 degrees, and 270 degrees of the tap A and the tap B. Here, the "confidence value" is light reception information of the light detection unit 30, and is an amount (a degree) of reflected light (active light), in which light emitted (emitted) from the light source 20 is reflected by a measuring object (subject) and returned to the light detection unit 30. In FIG. 7, a solid line represents the confidence value, a dotted line represents an I-value ($=dm_0-dm_2$), and a broken line represents a Q-value ($=dm_1-dm_3$). Details of dm will be described later.

Figure 8:
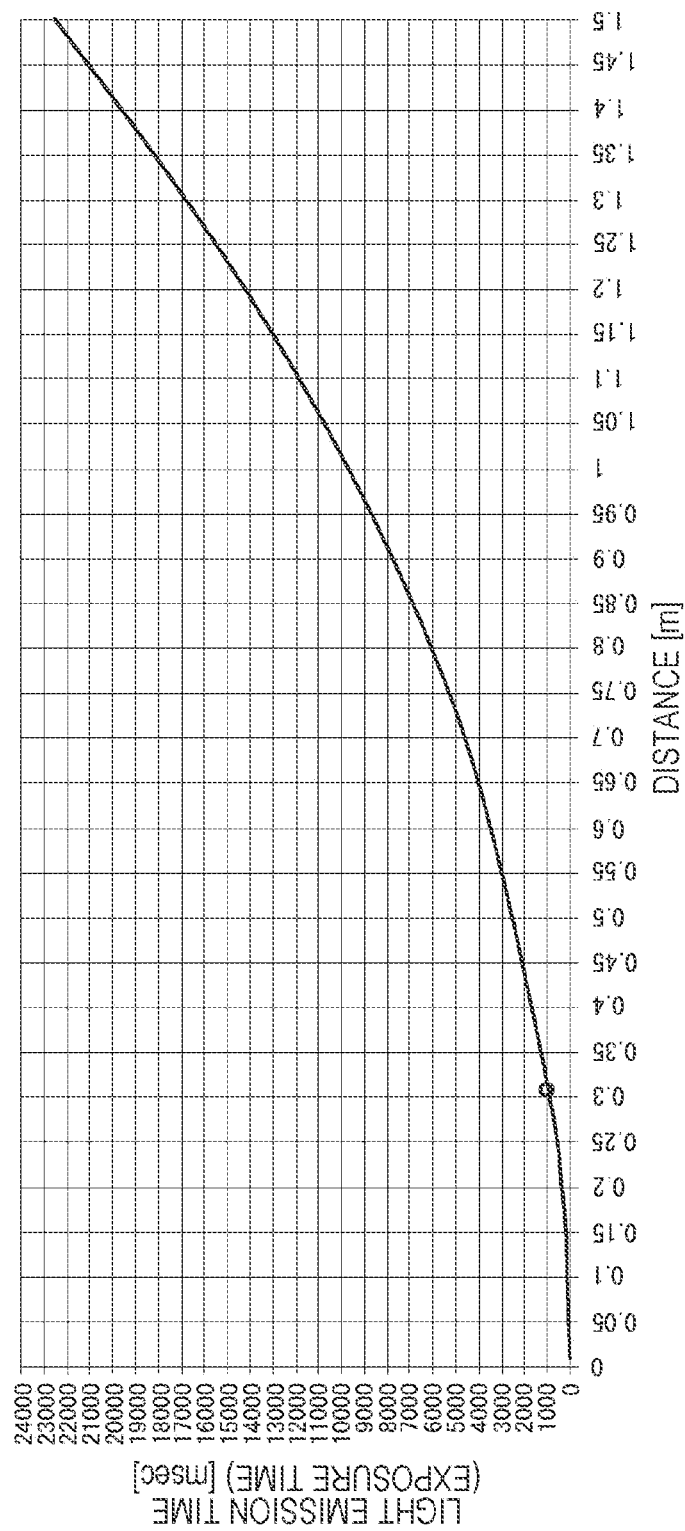
FIG. 8 is a characteristic diagram illustrating a relationship of an exposure time to a distance based on a case where a subject having a certain reflectance is placed at a distance of 10 [cm].

FIG. 8 illustrates a relationship of an exposure time (a light emission time) to a distance based on a case where a subject (measuring object) having a certain reflectance is placed at a distance of 10 [cm]. The characteristic diagram of FIG. 8 illustrates that, for example, when a subject having the same reflectance is gradually moved away under an exposure time of 1000 [μsec], irradiation for a time of about 2500 [μsec] is required at a distance of 50 [cm].

In the characteristic diagram of FIG. 8, a ratio of the confidence value (Confidence ratio) to the distance is ¹⁄₁₀₀₀ times at 31.6 [cm]. This means that a confidence value obtained in a case where the subject having a certain reflectance is placed at the distance of 10 [cm] and the exposure time is 1 [msec] is the same as a confidence value obtained in a case where the subject having the same reflectance is placed at the distance of 31.6 [cm] and the exposure time is 1000 [msec].

<AE Control According to Conventional Example>

Figure 9:
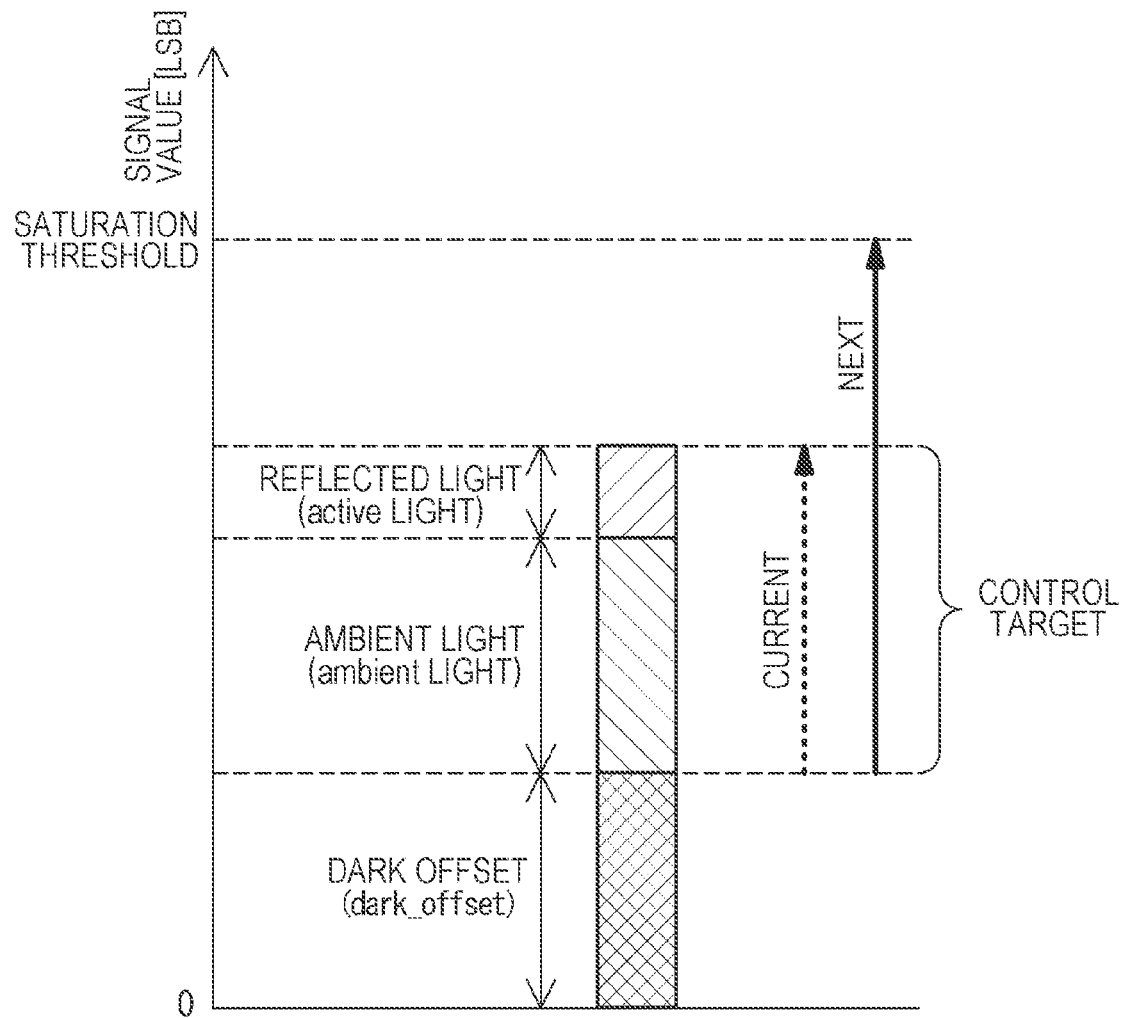
FIG. 9 is a diagram schematically illustrating AE control according to a conventional example.

In AE control according to a conventional example, in order to always obtain a maximum SN ratio, an exposure time for achieving a barely unsaturated state (a state as close as possible to a saturation threshold) is calculated, and control is performed on the basis of the exposure time. FIG. 9 schematically illustrates the AE control according to the conventional example. In the AE control according to the conventional example, reflected light (active light) and ambient light (ambient light) are used as a control target. If the control target of a current frame is lower than a saturation threshold, control is performed to bring the control target of a next frame close to the saturation threshold as much as possible.

Figure 10:
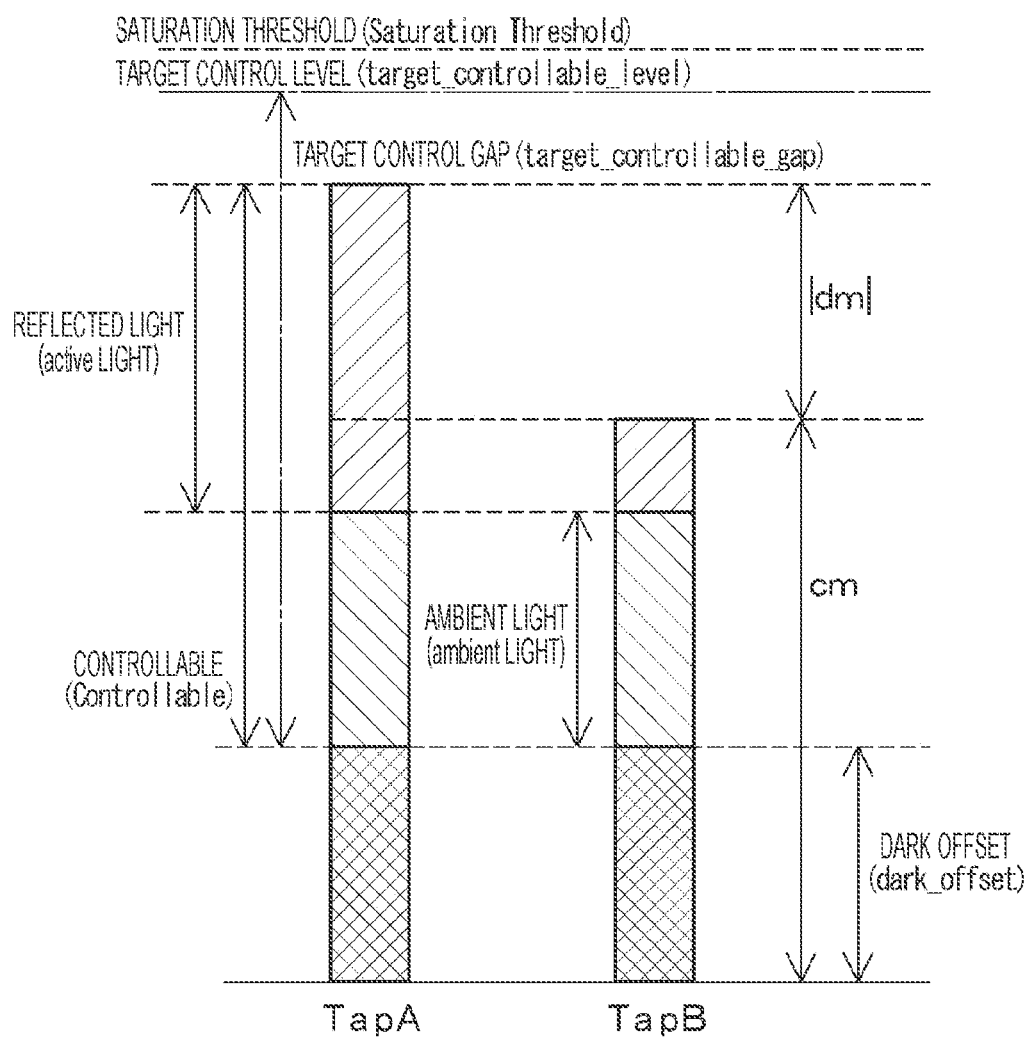
FIG. 10 is a diagram schematically illustrating calculation of an exposure time in AE control according to the conventional example.

FIG. 10 schematically illustrates the calculation of the exposure time in the AE control according to the conventional example. In FIG. 10, cm represents a common portion of the smaller of the tap A and the tap B (in this example, the tap B) with respect to the reflected light (active light) and the ambient light (ambient light), and |dm| represents an absolute value of a difference between the larger and the smaller of the tap A and the tap B with respect to the reflected light (active light). Furthermore, the saturation threshold (Saturation Threshold), a target control level (target_controllable level), a target control gap (target_controllable_gap), and a dark offset (dark_offset) are parameters, and the common portion cm, the absolute value |dm| of the difference, the reflected light (active light), and the ambient light (ambient light) are observation values. Here, the target control gap (target_controllable_gap) is expressed as follows:

target_controllable_gap=target controllable level-dark_offset.

<AE Control According to First Embodiment>

The distance measuring device 1 of the ToF method can be used by being mounted on an electronic device having a camera function, for example, a mobile device such as a smartphone, a digital camera, a tablet, or a personal computer. Then, in AE control of the distance measuring device 1, in order to acquire a high-quality distance image, an object is to perform control such that a maximum confidence value (Confidence) level can be acquired within a range not exceeding a saturation threshold with the saturation threshold as a target.

However, in particular, in the distance measuring device mounted on the mobile device, an irradiation time of laser light cannot be set long due to an allowable limit of power consumption and influence of camera shake of the mobile device, or all sections of a distance measuring range cannot be irradiated with light from the light source 20 due to a setting limit of laser output intensity of the light source 20 and the like. As a result, in the AE control according to the conventional example, the AE control is effective only in a part of a section of the distance measuring range, for example, in a part of a short distance section (that is, exposure variation by the AE control does not occur).

Therefore, in the AE control according to the first embodiment of the present disclosure, a wider section of the distance measuring range is sufficiently irradiated with light from the light source 20 so that the AE control is effective (that is, exposure variation by the AE control occurs) over the wider section of the distance measuring range. More specifically, in the AE control according to the first embodiment, an object is to constantly maintain a designated confidence value (Confidence), an exposure time for making a light amount of reflected light (active light) constant at all times is calculated with a portion of the reflected light as a control target, and the control is performed on the basis of the exposure time.

Figure 11:
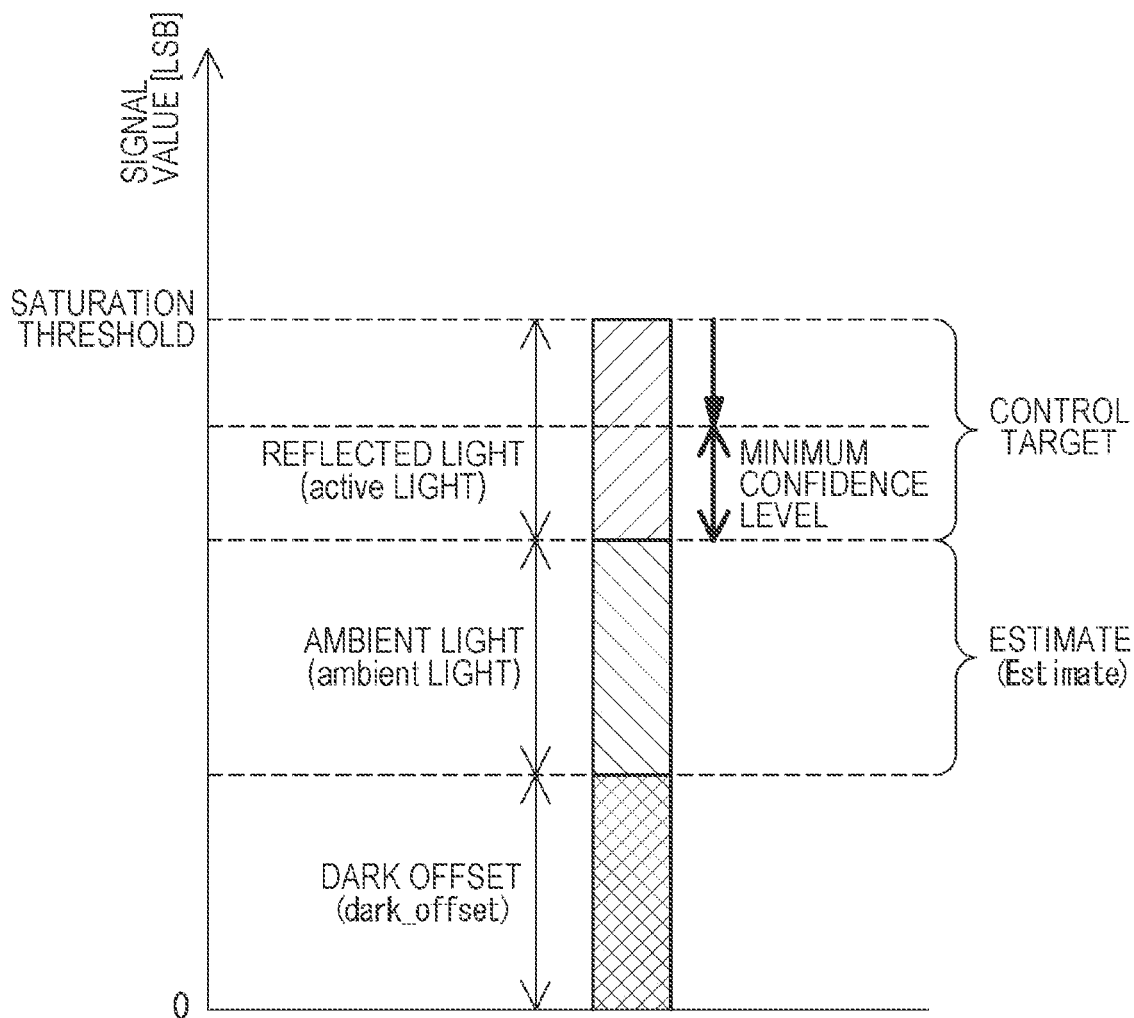
FIG. 11 is a diagram schematically illustrating AE control according to the first embodiment of the present disclosure.

FIG. 11 schematically illustrates the AE control according to the first embodiment of the present disclosure. In a case where the portion of the reflected light serves as the control target, it is necessary to separate a reflected light component and an ambient light component. By turning off the light source 20 and imaging in the same exposure time, the ambient light component can be individually acquired. In the first embodiment, a method for estimating the ambient light component on the basis of RAW image data of the light detector 30 and separating the reflected light component and the ambient light component is adopted. However, the present invention is not limited to this method.

(About Calculation Processing of Exposure Time)

Figure 12:
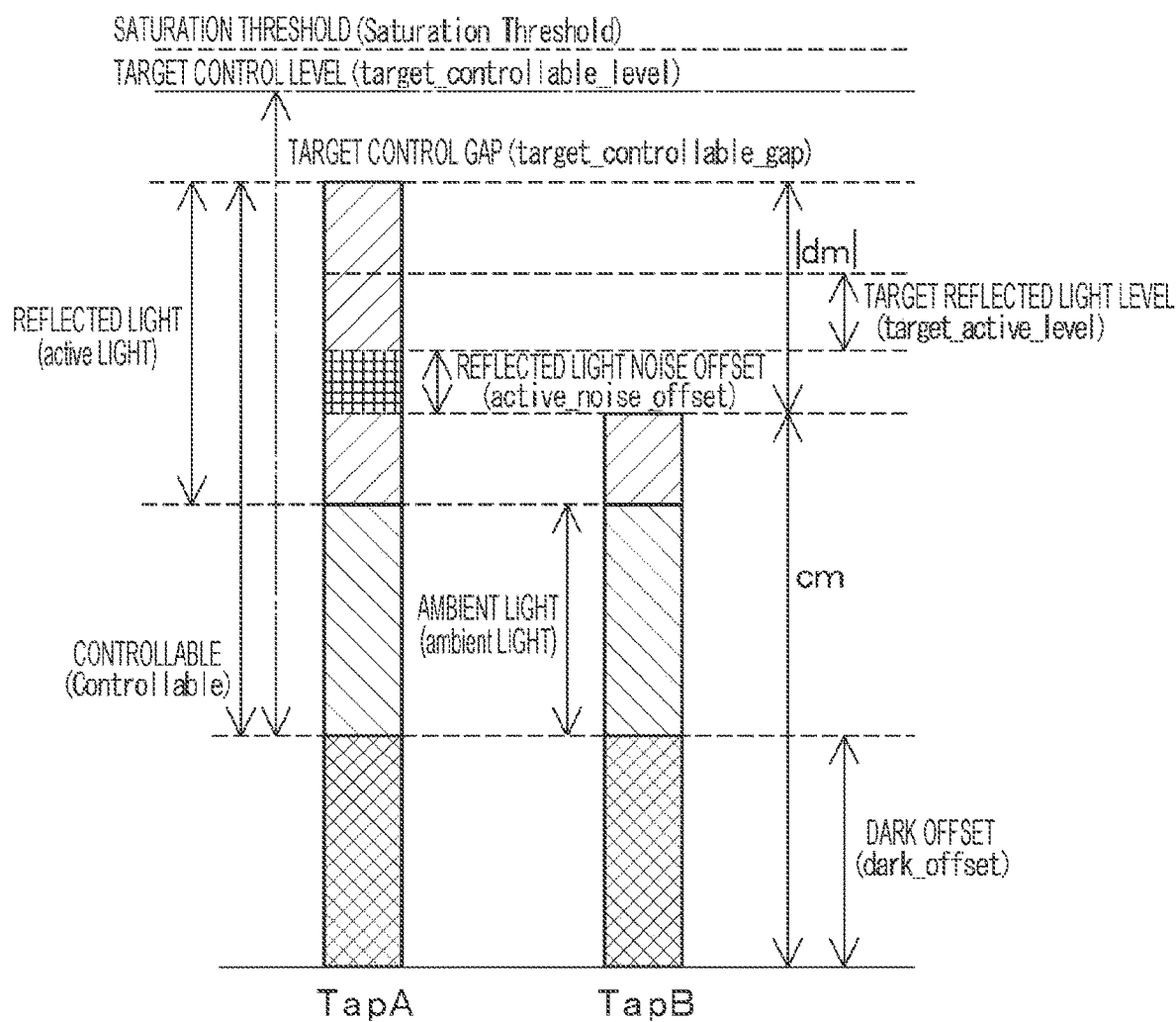
FIG. 12 is a diagram schematically illustrating calculation processing of an exposure time in the AE control according to the first embodiment of the present disclosure.

FIG. 12 schematically illustrates calculation processing of an exposure time in the AE control according to the first embodiment of the present disclosure. In FIG. 12, cm represents a common portion of the smaller of the tap A and the tap B (in this example, the tap B) with respect to the reflected light and the ambient light, and |dm| represents an absolute value of a difference between the larger and the smaller of the tap A and the tap B with respect to the reflected light. Furthermore, a saturation threshold (Saturation Threshold), a target control level (target controllable level), a target control gap (target_controllable_gap), a reflected light noise offset (active_noise_offset), a target reflected light level (target_active_level), and a dark_offset (dark_offset) are parameters, and the common portion cm, the absolute value |dm| of the difference, the reflected light, and the ambient light are observation values. Here, the target control gap (target_controllable_gap) is expressed as follows:

target_controllable_gap=target controllable level-dark_offset.

Here, the difference dm between the larger and the smaller of the tap A and the tap B will be described. When signal values of 0 degrees, 90 degrees, 180 degrees, and 270 degrees of the tap A are represented by $TapA_0$, $TapA_1$, $TapA_2$, and $TapA_3$, and signal values of 0 degrees, 90 degrees, 180 degrees, and 270 degrees of the tap B are represented by $TapB_0$, $TapB_1$, $TapB_2$, and $TapB_3$, $dm_0 = TapA_0 - TapB_0$ $dm_1 = TapA_1 - TapB_1$ $dm_2 = TapA_2 - TapB_2$ $dm_3 = TapA_3 - TapB_3$.

On the basis of the above $dm_0$, $dm_1$, $dm_2$, and $dm_3$, an I-value is obtained from the following equation:

$I = dm_0 - dm_2$, and is set on an X-axis, and a Q-value is obtained from the following equation:

$Q = dm_1 - dm_3$, and is set on a Y-axis, thereby creating an IQ plane (see FIG. 7). FIG. 7 illustrates the relationship between the signal value and the distance for the confidence value of the IQ plane calculated from the signals of 0 degrees, 90 degrees, 180 degrees, and 270 degrees of the tap A and the tap B. Furthermore, the confidence value can be expressed as:

confidence value=$|I|+|Q|$.

In calculating the exposure time for making the light amount of the reflected light constant at all times, a measured value (measured_active) corresponding to the difference dm between the larger and the smaller of the tap A and the tap B is obtained. For the measured value (measured_active) corresponding to the difference dm, an average value of the differences dm or an average value of confidence values in a predetermined region of interest (ROI) can be obtained as the measured value. Then, an integral coefficient of a next frame is obtained on the basis of a predetermined arithmetic expression using the obtained measurement value and the parameters such as the target control gap (target_controllable_gap), the target reflected light level (target_active_level), and the reflected light noise offset (active_noise_offset). An exposure time (next_exposure_time) of the next frame is obtained from the integral coefficient and an exposure time (current_exposure_time) of a current frame.

(About Mechanism of AE Control According to Distance)

Figure 13:
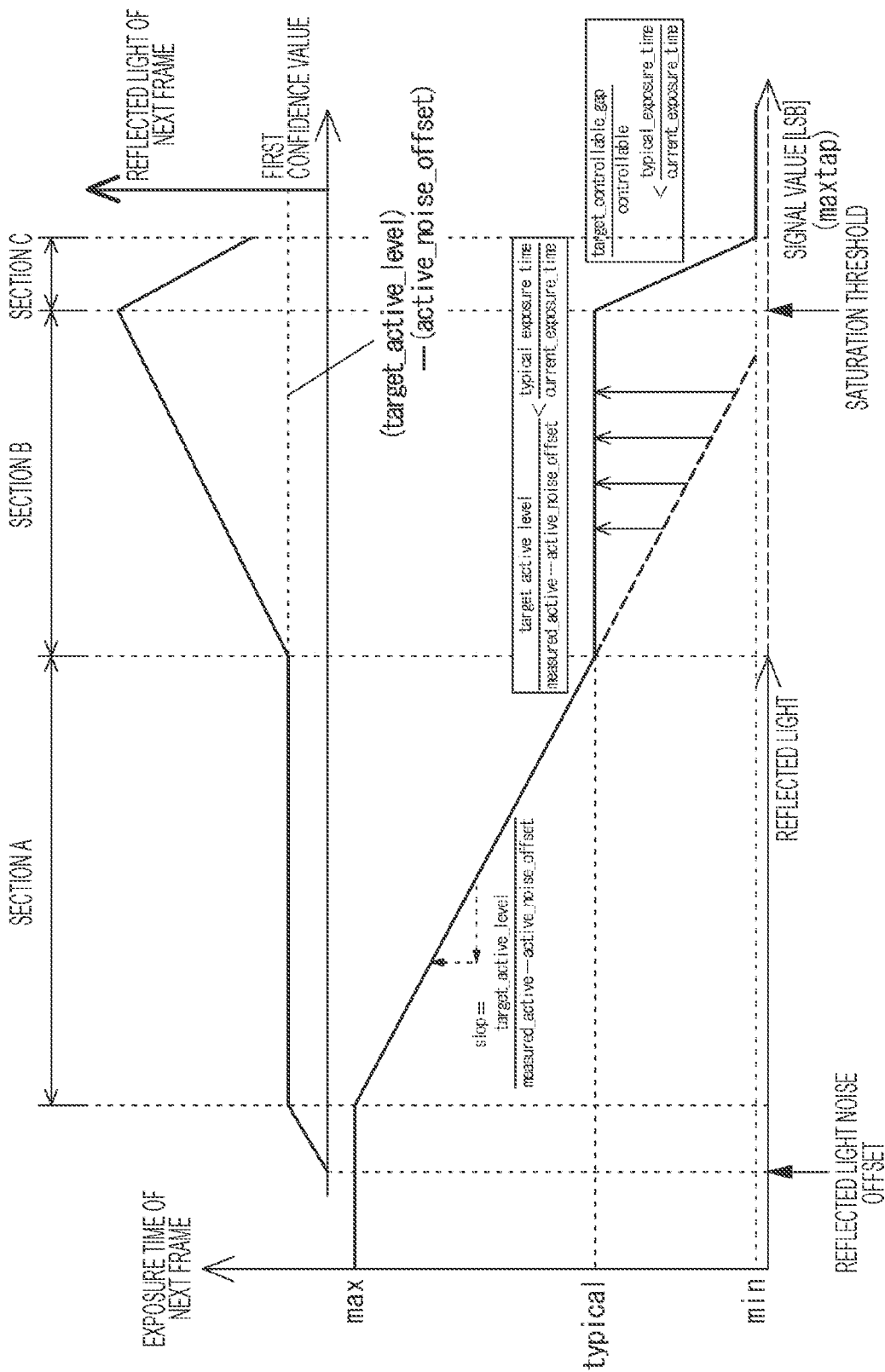
FIG. 13 is an AE chart of the AE control according to the first embodiment of the present disclosure.
Figure 14:
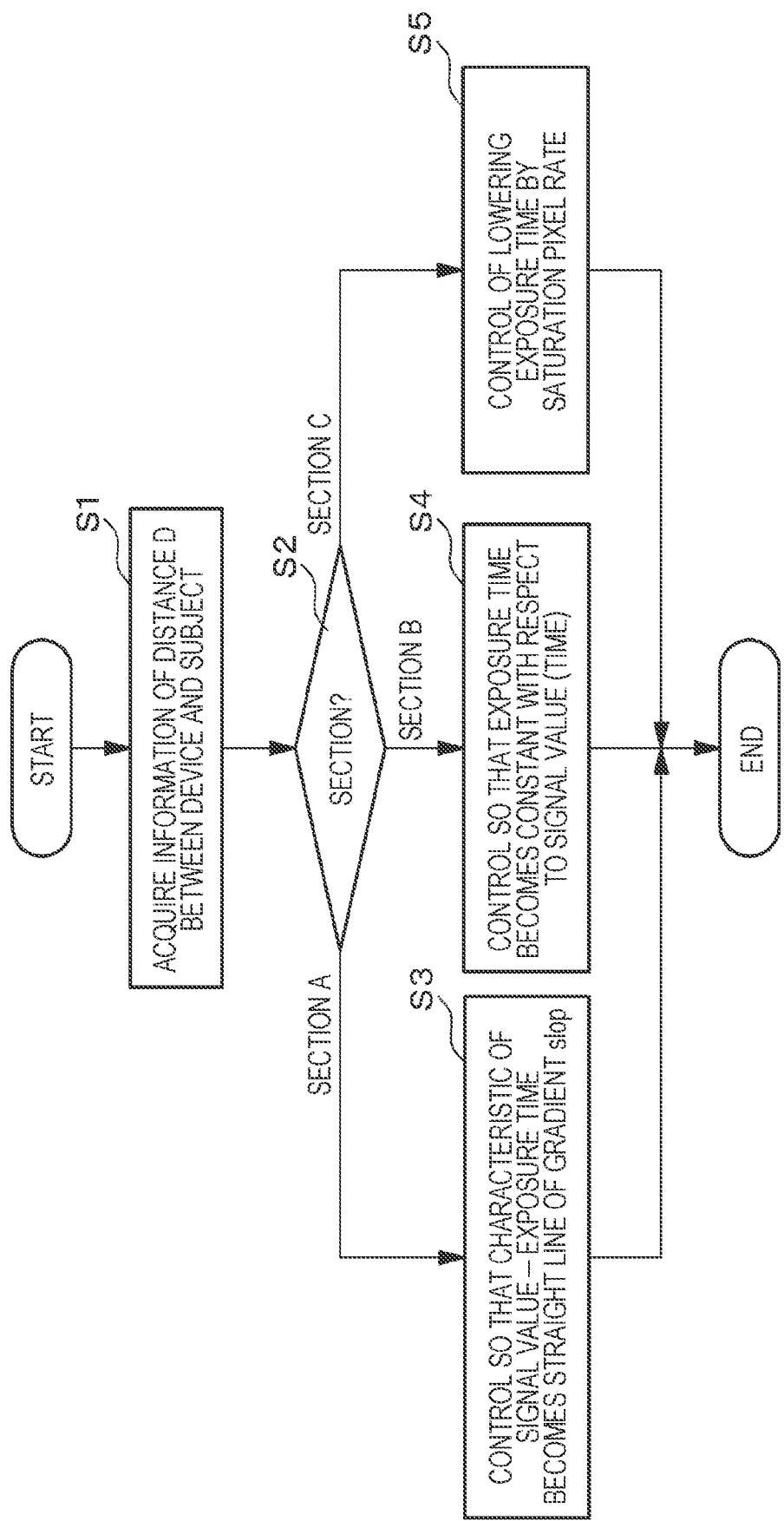
FIG. 14 is a flowchart of basic processing of the AE control according to the first embodiment of the present disclosure.

FIG. 13 illustrates an AE chart of the AE control according to the first embodiment of the present disclosure, and FIG. 14 illustrates a flowchart of basic processing of the AE control according to the first embodiment. This processing is processing in the AE control unit 40 illustrated in FIG. 2.

Then, when a function of the AE control unit 40 is realized by a processor, the basic processing of the AE control is executed under the control of the processor.

In the first embodiment, a mechanism of the AE control in which the control is divided according to a distance between the distance measuring device 1 and a subject (measuring object) is adopted, and the control according to the distance is roughly divided into control of three sections of a section A, a section B, and a section C. The section A is subjected to control in a case where the distance between the distance measuring device 1 and the subject is relatively long, that is, of a distant view. The section B is subjected to control in a case where the distance between the distance measuring device 1 and the subject is relatively short, that is, of a near view. The section C is subjected to control in a case where the distance between the distance measuring device 1 and the subject is very short, that is, of an ultra-near view.

In the AE chart of FIG. 13, a vertical axis represents an exposure time of a next frame, and a horizontal axis represents a signal value [LSB] of a maximum tap maxtap of the light detection unit 30. The maximum tap maxtap is given as follows:

$$\text{maxtap} = \max\{cm[i] + |dm[i]|\}. \text{ Here, } i=0 \text{ to } 3.$$

Furthermore, as is clear from the characteristic diagram of FIG. 6, since the signal value of the light detection unit 30 based on the light intensity attenuates in inverse proportion to the square of the distance, the signal value [LSB] on the horizontal axis corresponds to the distance between the distance measuring device 1 and the subject. Then, in the AE control according to the first embodiment, a control value (an exposure time) optimal for acquisition of depth information (depth information) in the distance measuring unit 50 is calculated on the basis of the signal value output from the light detection unit 30 to perform exposure control.

The processor constituting the AE control unit 40 acquires a distance D from the distance measuring device 1 to a measuring object calculated by the distance measuring unit 50 (step S1), then determines the section A, the section B, or the section C (step S2), and then performs control for each section as follows (steps S3 to S5).

In the AE control according to the first embodiment, processing for maintaining a first confidence value (target reflected light level (target_active_level)−reflected light noise offset (active_noise_offset)) designated as a control parameter (threshold) and obtaining a distance image (depth map) having a minimum SN ratio is performed in the control of the section A (distant view). Specifically, control is performed such that a characteristic of the signal value—the exposure time in the section A becomes a straight line (linear) of a gradient slop given by an equation illustrated in FIG. 13 (step S3).

In the control of the section B (near view), processing for maintaining a designated typical exposure time and obtaining a distance image with a high SN ratio is performed. Specifically, control is performed so that the exposure time is switched from the straight line (straight line indicated by a dotted line in the drawing) of the gradient slop obtained in the section A to a typical exposure time and the exposure time becomes constant with respect to the signal value (distance) (step S4). Therefore, it is possible to secure a confidence value equal to or more than a designated minimum value for an application in which a near view is important.

In the control of the section C (ultra-near view), saturation pixels exceeding the saturation threshold start to appear, and thus, as in the case of the AE control according to the conventional example, control of lowering the exposure time by a saturation pixel rate is performed (step S5). Here, the "saturation pixel rate" is a ratio of saturation pixels exceeding a saturation threshold to the total number of pixels in a predetermined region of interest (ROI) to be optimized.

Figure 15:
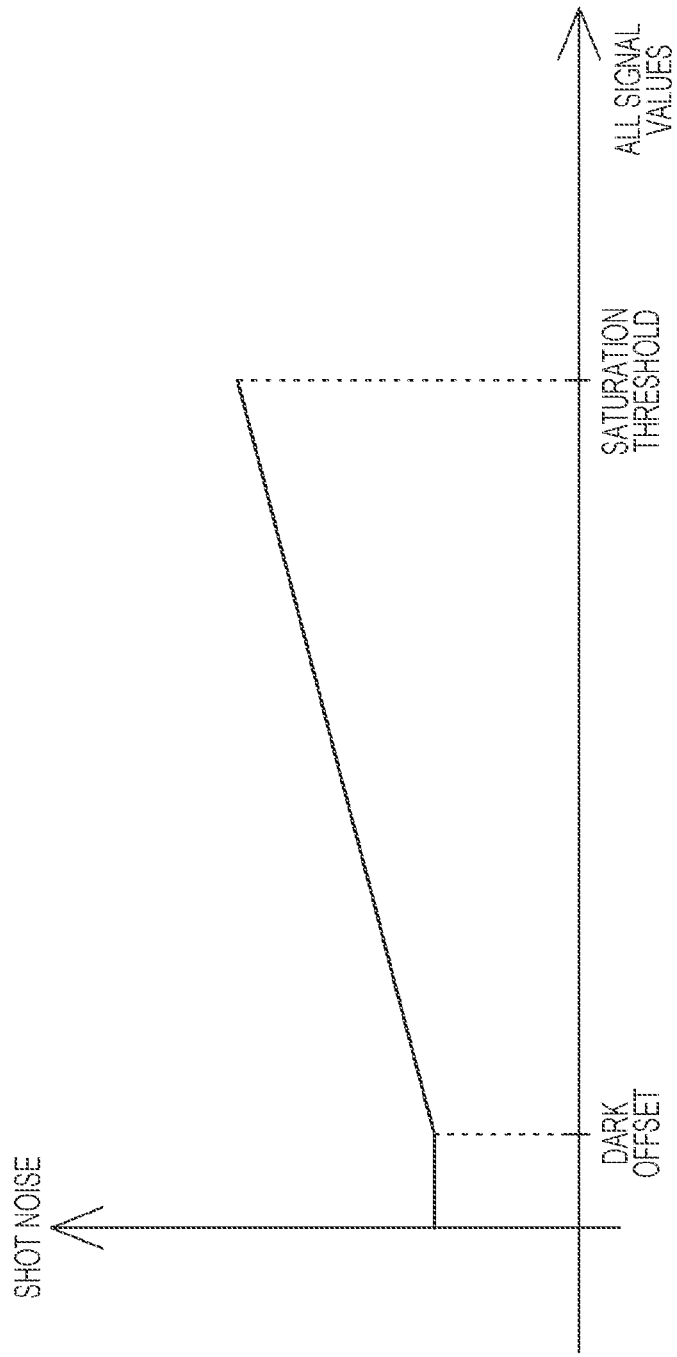
FIG. 15 is a characteristic diagram illustrating a characteristic of shot noise with respect to all signal values (average value).

Furthermore, in the AE control according to the first embodiment, a noise amount of a reflected light (active light) component is adaptively controlled with reference to the signal value output from the light detection unit 30. Specifically, in the AE control according to the first embodiment, it is assumed that the noise amount of the reflected light (active light) component has a linear relationship with shot noise of the light detection unit 30, and the reflected light noise offset (active_noise_offset) illustrated in FIG. 12 is adaptively controlled. FIG. 15 illustrates a characteristic diagram of the shot noise with respect to all signal values (average value), and FIG. 16 illustrates a characteristic diagram of the reflected light noise offset with respect to all the signal values (average value).

Figure 16:
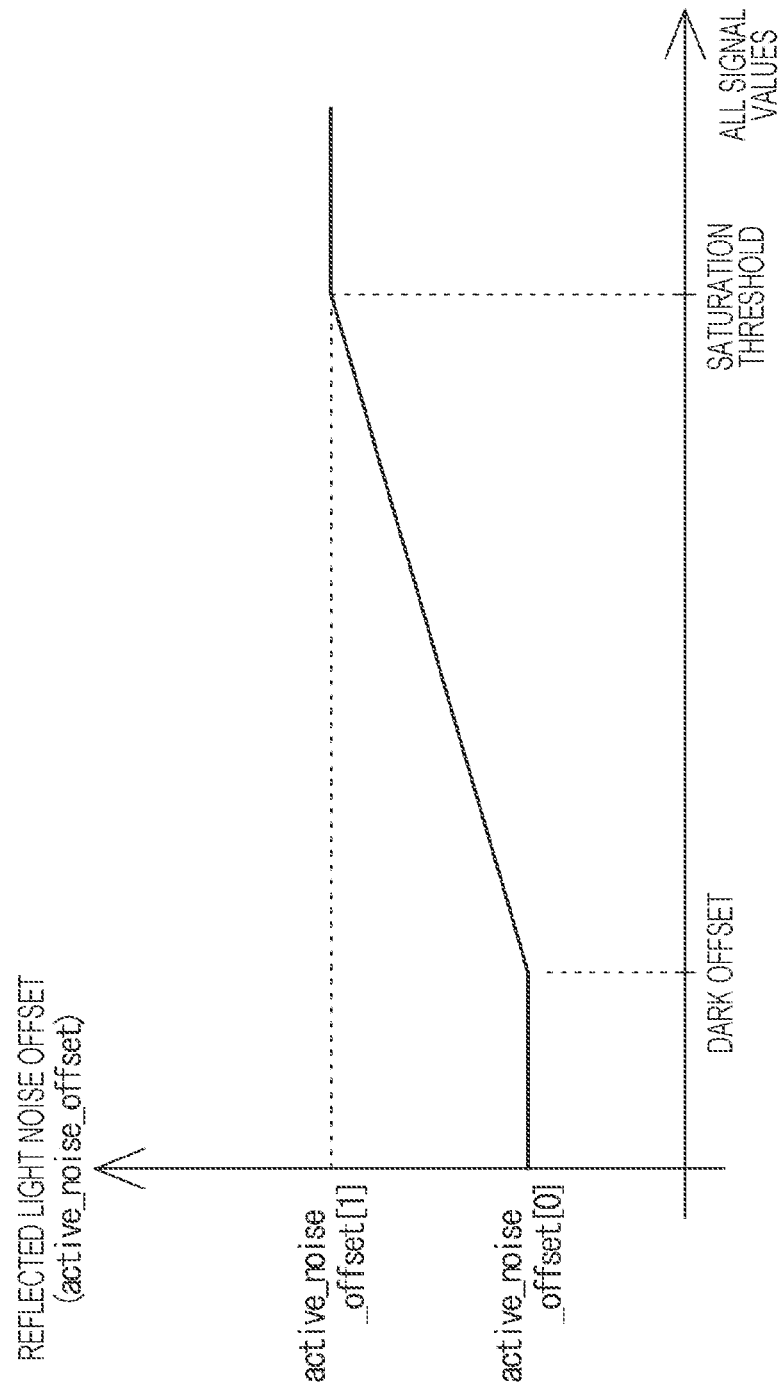
FIG. 16 is a characteristic diagram illustrating a characteristic of a reflected light noise offset with respect to all the signal values (average value).

In the adaptive control of the reflected light noise offset, as illustrated in FIG. 16, control is performed in which a reflected light noise offset (active_noise_offset [0]) at a dark offset and a reflected light noise offset (active_noise_offset [1]) corresponding to a saturation threshold are set, and the reflected light noise offset is made to linearly transition between the two. As described above, by performing the adaptive control on the reflected light noise offset, even if magnitude of noise is different between indoors and outdoors, good AE control can be performed without being affected by the magnitude of noise.

As is clear from the above description, according to the AE control according to the first embodiment of the present disclosure, a wider section of the distance measuring range is sufficiently irradiated with the light from the light source 20, and the AE control is effective over the wider section of the distance measuring range. Here, "AE control is effective" means the following.

By controlling the exposure time (light emission time), the confidence value (Confidence) becomes constant.

It is possible to perform control so as not to exceed the saturation threshold.

In other words, according to the AE control according to the first embodiment of the present disclosure, even if there is a possibility of exceeding the saturation threshold in a certain scene (conditions such as a distance to a subject, a shape of the subject, reflectance of the subject, and a light amount of ambient light), it is possible to perform control so as not to exceed the saturation threshold.

Furthermore, according to the AE control according to the first embodiment of the present disclosure, by controlling the near view separately from the distant view, in a case where the present distance measuring device 1 is mounted on a mobile device such as a smartphone as described later, for example, it is possible to obtain an effect that the SN ratio can be maintained for an important distance measuring section in a gesture application or the like.

(About Specific Processing Flow of AE Control)

A specific processing flow of the AE control according to the first embodiment of the present disclosure will be described with reference to a flowchart of FIG. 17. Processing of the AE control exemplified here is the processing in the AE control unit 40 illustrated in FIG. 2. In FIG. 2, the AE control unit 40 includes the next frame light emission/ exposure condition calculation unit 41 and the next frame light emission/exposure control unit 42. However, each function of the next frame light emission/exposure condition calculation unit 41 and the next frame light emission/exposure control unit 42 can be implemented by a processor.

Hereinafter, in a case of a configuration in which each function of the next frame light emission/exposure condition calculation unit 41 and the next frame light emission/exposure control unit 42 is realized by the processor, the processing of the AE control is executed under the control of the processor constituting the AE control unit 40.

The processor constituting the AE control unit 40 (hereinafter simply described as a "processor") determines whether or not AE control processing is ended (step S11). If the AE control processing is not ended (NO in S11), the processor acquires RAW imaging data and light emission/exposure conditions of a current frame from the light detection unit 30 (step S12). The RAW imaging data and the light emission/exposure conditions of the current frame are a light emission time and light emission intensity of the light source 20 and an exposure time of the light detection unit 30 at the time of imaging of the current frame.

Next, the processor calculates light emission/exposure conditions of a next frame on the basis of the acquired RAW imaging data and the light emission/exposure conditions of the current frame (step S13). The light emission/exposure conditions of the next frame are a light emission time and light emission intensity of the light source 20 and an exposure time of the light detection unit 30 at the time of imaging of the next frame. Details of specific processing of step S13 will be described later.

Next, the processor notifies the light source 20 of the light emission/exposure conditions of the next frame calculated in the processing of step S13 (step S14), returns to step S11, and repeatedly executes the processing from step S11 to step S14 until it is determined that the AE control processing is ended in the processing of step S11. Then, if the AE control processing ends in the processing of step S11 (YES in S11), the processor ends the above-described series of processing for the AE control.

Figure 18:
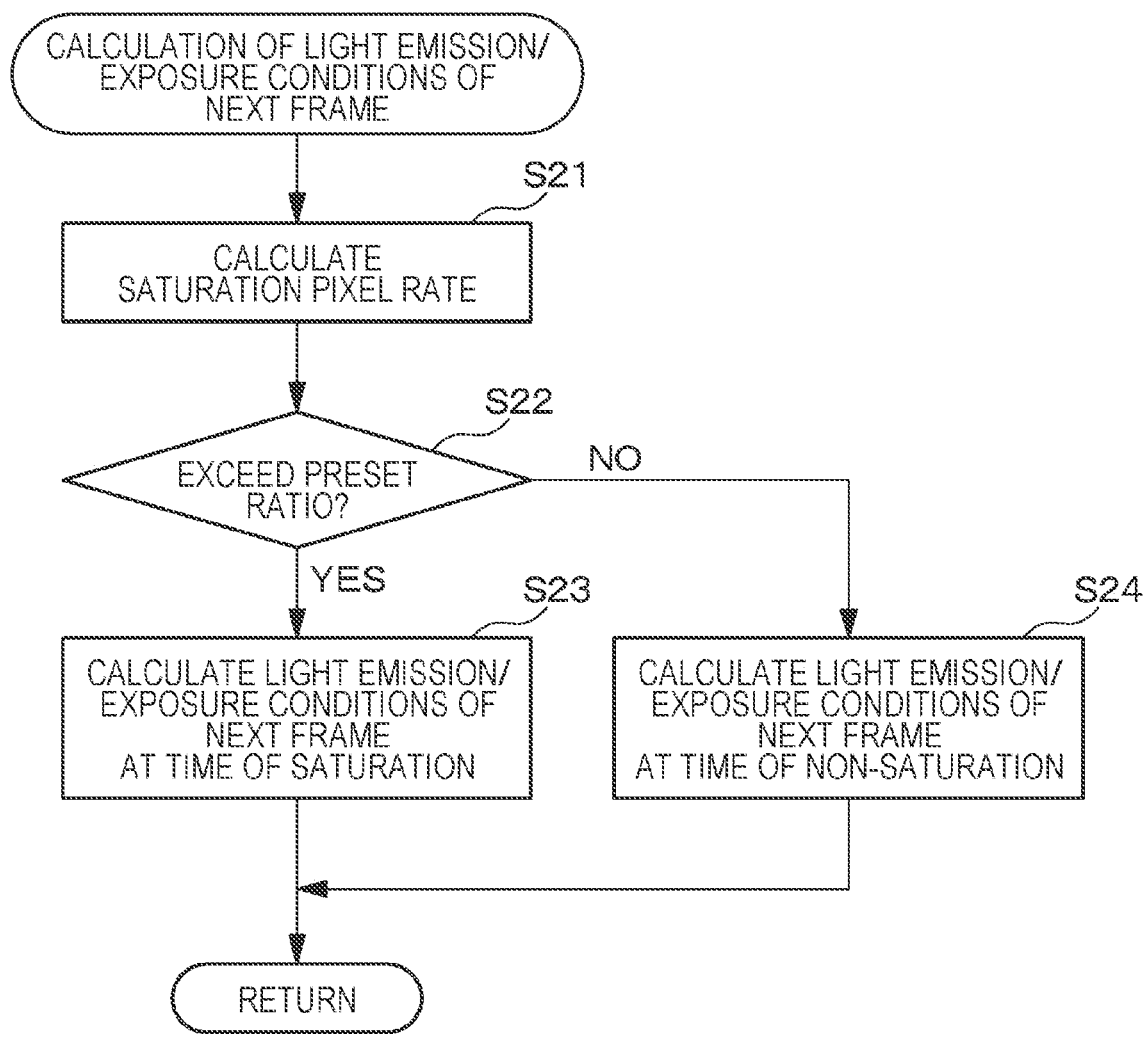
FIG. 18 is a flowchart illustrating a processing flow of calculating light emission/exposure conditions of a next frame on the basis of RAW imaging data and light emission/exposure conditions of a current frame.

Next, details of the specific processing of step S13, that is, the processing of calculating the light emission/exposure conditions of the next frame on the basis of the RAW imaging data and the light emission/exposure conditions of the current frame will be described with reference to a flowchart of FIG. 18.

Figure 17:
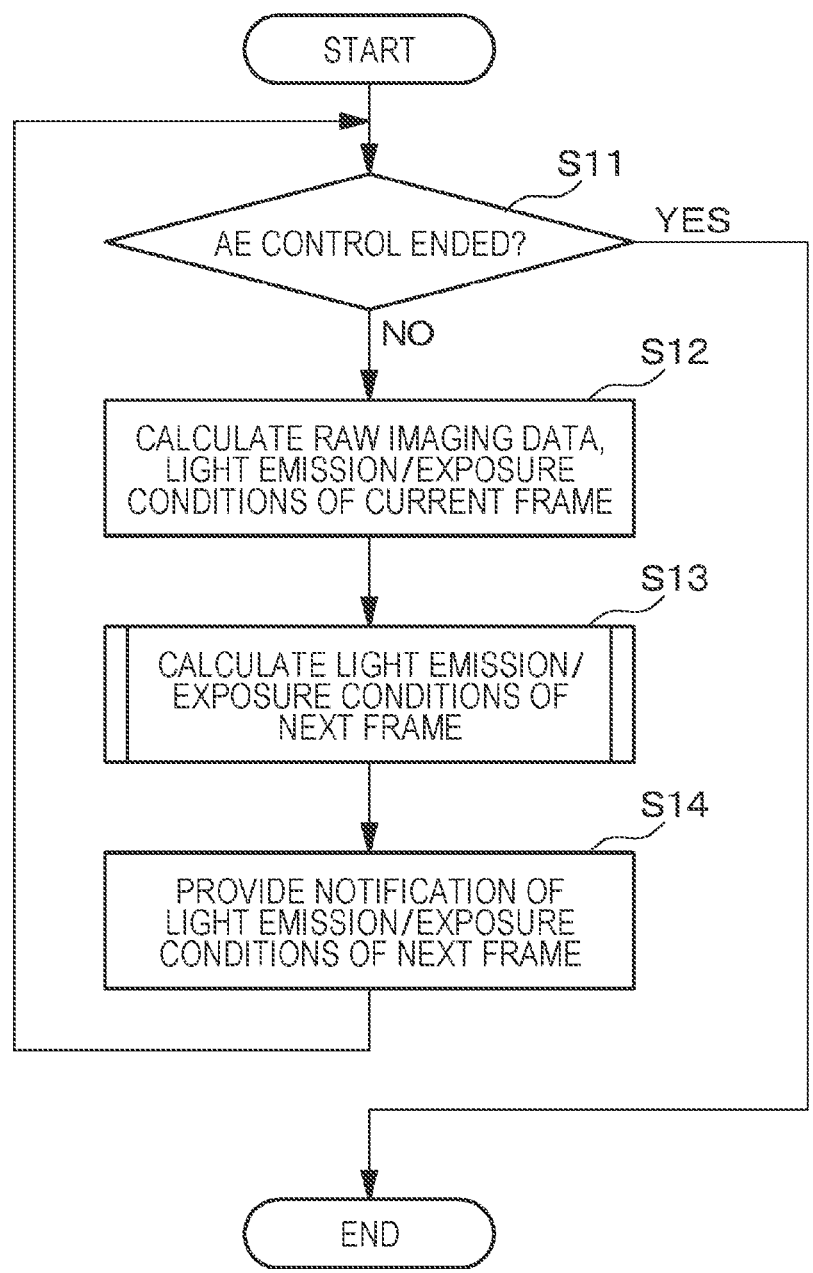
FIG. 17 is a flowchart for describing a specific processing flow of the AE control according to the first embodiment of the present disclosure.

The processor calculates a saturation pixel rate that is a ratio of saturation pixels to the total number of pixels in a predetermined region of interest (ROI) to be optimized on the basis of the RAW imaging data of the current frame acquired in the processing of step S12 in FIG. 17 (step S21). Next, the processor determines whether or not the saturation pixel rate exceeds a preset ratio (step S22). In a case where it is determined that the saturation pixel rate exceeds the preset ratio (YES in S22), the processor calculates light emission/exposure conditions of the next frame at the time of saturation (step S23). In a case where the saturation pixel rate exceeds the preset ratio, that is, a case where the number of saturation pixels is relatively large, linearity collapses, and it becomes difficult to calculate an optimum exposure time. Therefore, in step S23, processing of simply shortening the exposure time is performed.

In a case where it is determined that the saturation pixel rate does not exceed the preset ratio (NO in S22), the processor calculates light emission/exposure conditions of the next frame on the basis of the light emission/exposure conditions of the current frame acquired in the processing of step S12 in FIG. 17 (step S24). In the processing of step S24, calculation of an optimum exposure time (light emission time) and AE control according to a distance are performed under the processing described in the sections of "About calculation processing of exposure time" and "About mechanism of AE control according to distance".

After the processing of step S23 or after the processing of step S24, the processor returns to the flow in FIG. 17 and proceeds to the processing of step S14.

(About Control of Light Emission/Exposure Conditions)

Specific examples of controlling light emission/exposure conditions include the following two.

Example of Controlling Light Emission Time (Exposure Time)

Figure 19:
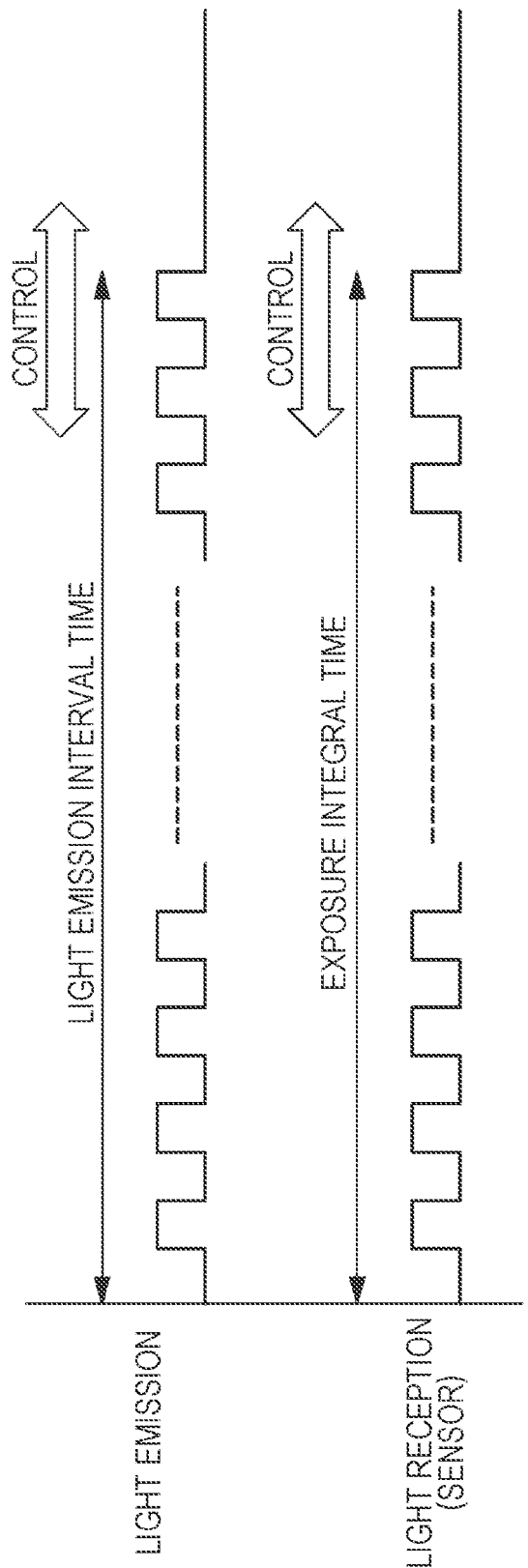
FIG. 19 is a timing chart illustrating an example of controlling a light emission time (an exposure time).

FIG. 19 is a timing chart illustrating an example of controlling a light emission time (an exposure time). In this control example, as illustrated in FIG. 19, the light emission/exposure conditions can be controlled by controlling a light emission interval.

Example of Controlling Light Emission Amplitude (Light Emission Intensity)

Figure 20:
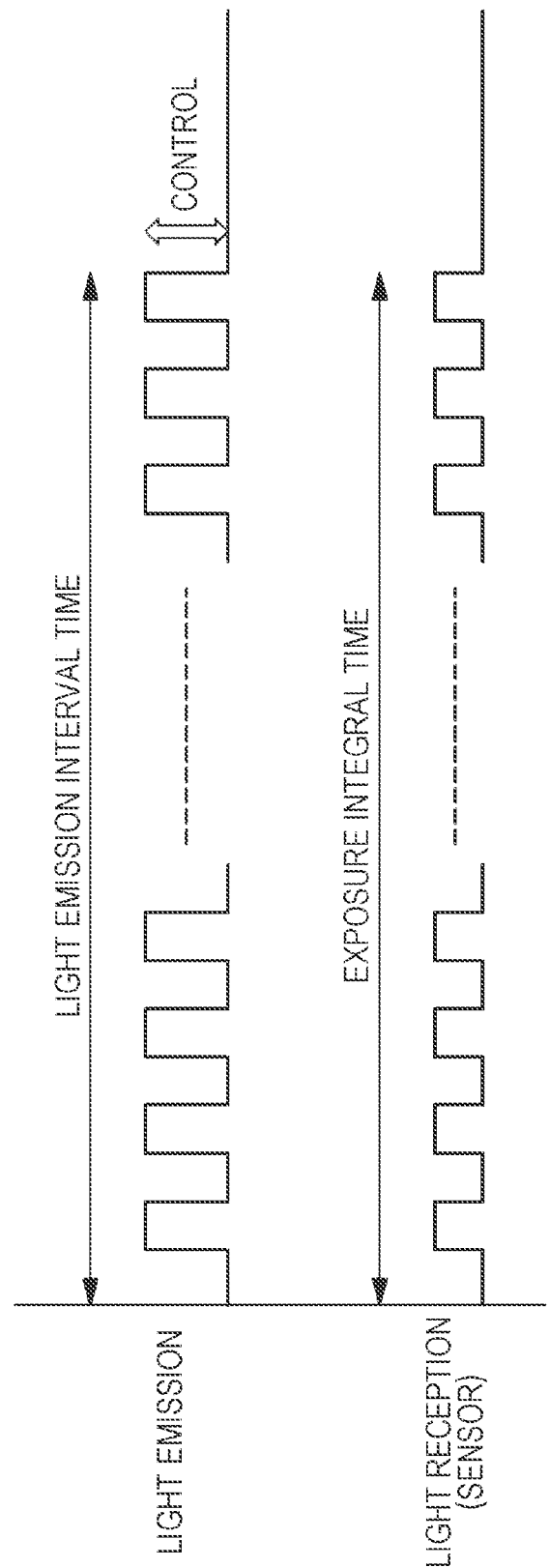
FIG. 20 is a timing chart illustrating an example of controlling light emission amplitude (light emission intensity).

FIG. 20 is a timing chart illustrating an example of controlling light emission amplitude (light emission intensity). In this control example, as illustrated in FIG. 20, the light emission/exposure conditions can be controlled by controlling light emission amplitude, that is, light emission intensity.

<AE Control According to Second Embodiment>

By the way, in the distance measuring device of the ToF method, if distance measurement is performed in a state in which an object which is not a distance measuring object (for example, an obstacle) exists at a very short distance, there is a case where scattered light from the object which is not the distance measuring object at the short distance is received even in a region where a subject which is the distance measuring object does not exist, and erroneous detection occurs due to the scattered light.

Therefore, in a second embodiment, even in an environment where an object which is not a distance measuring object exists at an extremely short distance so that influence of scattered light occurs (for example, a distance of about 20 cm), AE control enabling accurate distance measurement is performed for a subject which is a distance measuring object and its background. Specifically, in the AE control according to the second embodiment, in control of an ultra-near view in which a distance to the subject is an extremely short distance so that influence of scattered light occurs due to the presence of an object which is not a distance measuring object, an upper limit of a confidence value is defined as a second confidence value (control parameter/threshold), and the AE control is performed so as to maintain the second confidence value.

Figure 21:
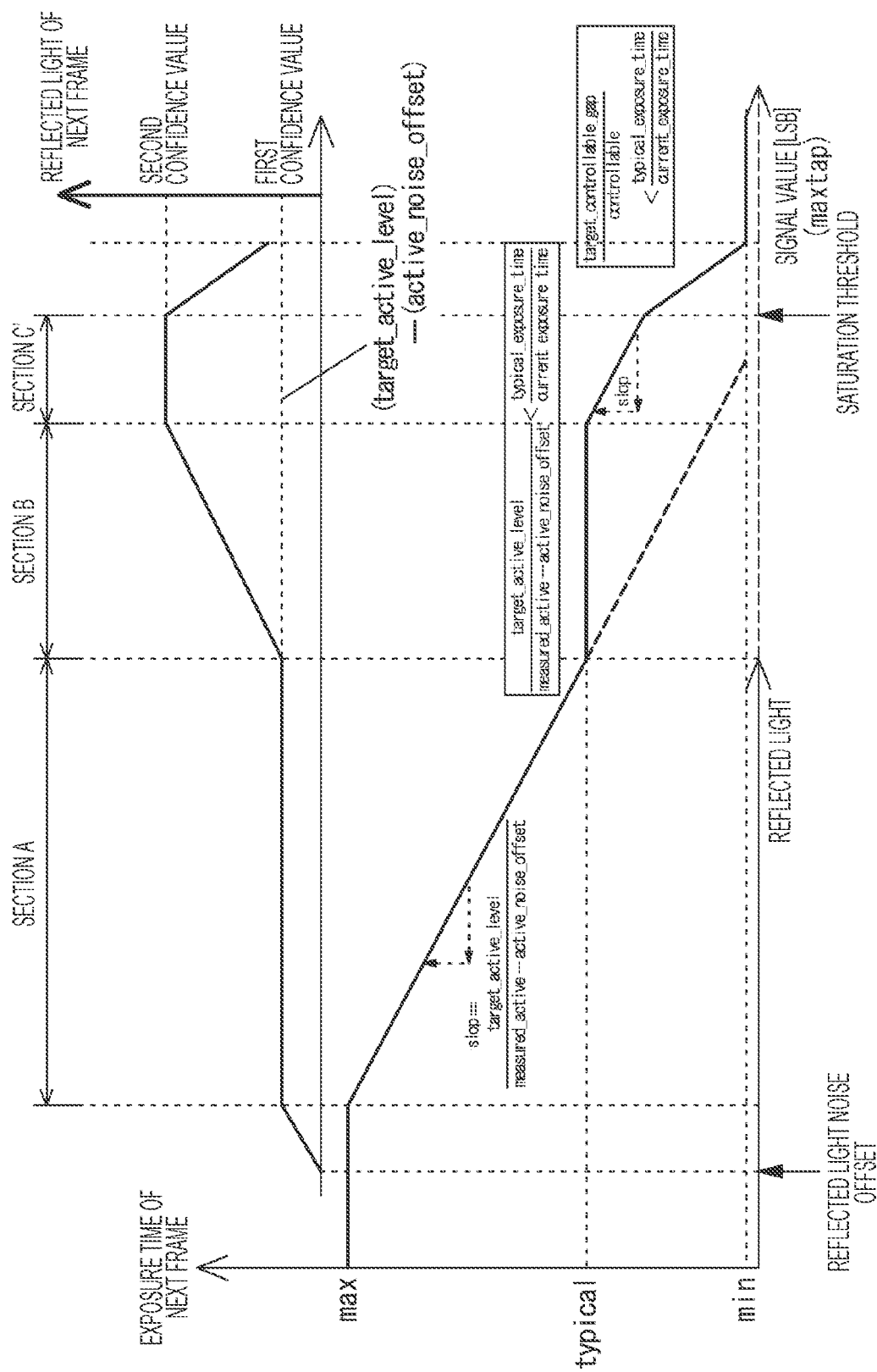
FIG. 21 is an AE chart of AE control according to a second embodiment of the present disclosure.

Here, as an example, the second confidence value as the control parameter/threshold is set to a confidence value higher than the first confidence value in a case of the control of the distant view in the AE control according to the first embodiment (first confidence value<second confidence value). Then, in the control of the ultra-near view, the control is reflected on an exposure time (or light emission intensity) so as to suppress a light amount of scattered light from an object which is not a distance measuring object at a short distance. FIG. 21 illustrates an AE chart for AE control according to the second embodiment.

Note that, here, a confidence value higher than the first confidence value is designated as the second confidence value. However, the first confidence value may be set equal to the second confidence value depending on a use case (for example, in a case where control of a long distance is unnecessary).

Figure 22:
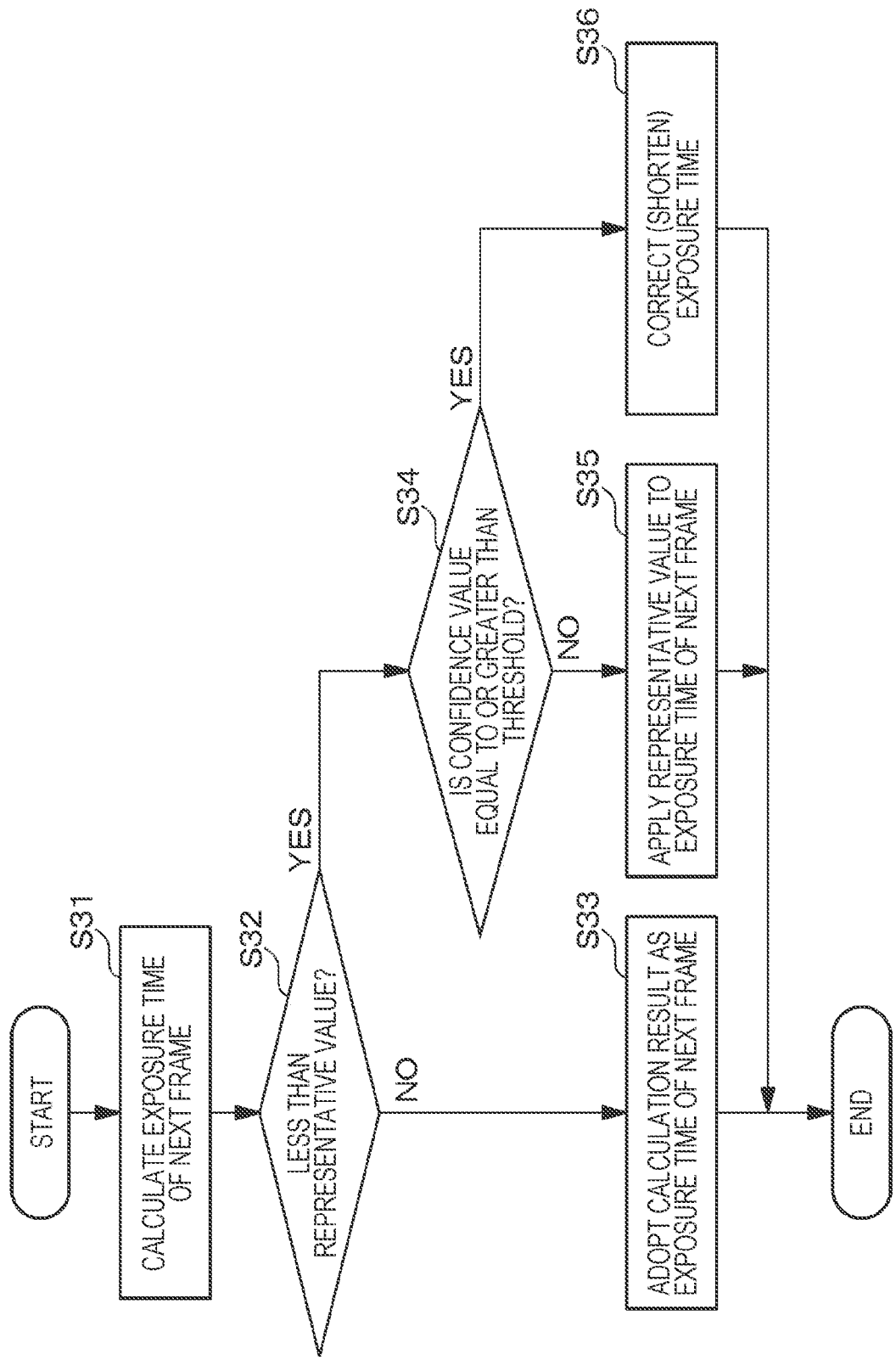
FIG. 22 is a flowchart illustrating a processing flow of the AE control according to the second embodiment of the present disclosure.

A processing flow of the AE control according to the second embodiment will be described with reference to a flowchart of FIG. 22. Processing of the AE control exemplified here is the processing in the AE control unit 40 illustrated in FIG. 2. Hereinafter, in a case of a configuration in which a function of the AE control unit 40 is realized by a processor, the processing of the AE control according to the second embodiment is executed under the control of the processor constituting the AE control unit 40.

The processor configuring the AE control unit 40 (hereinafter simply described as a "processor") first calculates an exposure time of a next frame (step S31), and then, determines whether or not the calculated exposure time is less than a designated representative value (typical) (step S32).

In a case where it is determined that the exposure time calculated in step S31 is greater than or equal to the representative value (NO in S32), the processor adopts a calculation result in step S31 as the exposure time of the next frame (step S33). This control is control of a section A (distant view). Then, processing of maintaining a first confidence value designated as a control parameter (threshold) and obtaining a distance image with a minimum SN ratio is performed by this control of the distant view. Specifically, control is performed such that a characteristic of a signal value—an exposure time in the section A becomes a straight line of a gradient slop given by an equation illustrated in FIG. 21.

In a case where it is determined that the exposure time calculated in step S31 is less than the representative value (YES in S32), the processor then determines whether or not a confidence value is equal to or greater than a threshold (=second confidence value) that is a control parameter (step S34).

In a case where it is determined that the confidence value is less than the threshold (NO in S34), the representative value is applied to the exposure time of the next frame (step S35). This control is control of a section B (near view). By this control of the near view, processing for maintaining the exposure time designated as the representative value and obtaining a distance image with a high SN ratio, that is, processing for making the signal value (distance) have a constant exposure time is performed. Therefore, it is possible to secure a confidence value equal to or more than a designated minimum value for an application in which a near view is important.

In a case where it is determined that the confidence value is greater than or equal to the threshold (YES in S34), the processor corrects the exposure time of the next frame, specifically, performs control to shorten the exposure time (step S36). This control is control of a section C', that is, control of an ultra-near view. For the ultra-near view, a distance to the subject (that is, a distance between the distance measuring device and the subject) can be set to a short distance so that influence of scattered light occurs due to the presence of an object which is not a distance measuring object.

Then, in the control of the ultra-near view, the exposure control of shortening the exposure time again is performed so as to maintain the second confidence value designated as the control parameter (threshold). A gradient slop of the exposure time in a case of the section C' (ultra-near view) is the same as the gradient slop in a case of the control of the section A (distant view). By controlling this ultra-near view, in an environment where the object which is not the distance measuring object exists at an extremely short distance in which influence of scattered light occurs, it is possible to suppress a light amount of the scattered light from the object.

Under an environment where an object which is not the distance measuring object exists nearby, there is influence of scattered light. However, relative intensity of the scattered light is reduced by appropriately controlling a confidence value of an entire screen. Therefore, in the ultra-near view in which the influence of the scattered light occurs due to the presence of the object which is not the distance measuring object, the upper limit of the confidence value is defined as the second confidence value, and the AE control is performed so as to maintain the second confidence value. Thus, accurate distance measurement can be performed for the subject which is the distance measuring object and the background thereof, while suppressing the influence of the scattered light from the object which is not the distance measuring object.

The AE control according to the second embodiment described above is executed on the basis of information of one imaging frame. In general, it is difficult to determine whether scattered light occurs or a subject is actually present in an environment where scattered light occurs from information of one imaging frame, so that a plurality of images is captured or a scattered light removal filter is used.

According to the AE control according to the second embodiment, even in the ultra-near view in which the influence of the scattered light occurs due to the presence of the object which is not the distance measuring object, it is possible to maintain appropriate distance measurement performance, while suppressing the influence of the scattered light from the object which is not the distance measuring object, without imaging the plurality of images or using the scattered light removal filter. Other than the ultra-near view, the longer the exposure time, the more advantageous the SN ratio can be secured.

<Modified Example>

Although the technology of the present disclosure has been described above on the basis of the preferred embodiments, the technology of the present disclosure is not limited to the embodiments. The configuration and structure of the distance measuring device described in each of the embodiments described above are examples and can be changed as appropriate. For example, in the first embodiment, upon dividing the control according to the distance between the distance measuring device 1 and the subject (measuring object), the control is performed in the three sections of the distant view, the near view, and the ultra-near view, but the present invention is not limited thereto. Specifically, the control can be performed in two sections of a distant view and a near view, or the control can be performed in four or more sections by further subdividing the distant view and the near view.

<Application Example>

In each of the embodiments described above, a case where the distance measuring device of the present disclosure is used as the means to acquire a distance image (depth map) has been described as an example. However, the distance measuring device of the present disclosure is not only used as the means to acquire a distance image, but can be applied to autofocus that automatically focuses a camera.

<Electronic Device of the Present Disclosure>

The distance measuring device of the present disclosure described above can be used as a distance measuring device mounted on various electronic devices. As the electronic device on which the distance measuring device is mounted, for example, mobile devices such as a smartphone, a digital camera, a tablet, and a personal computer can be exemplified. However, the present invention is not limited to the mobile devices. Here, a smartphone is exemplified as a specific example of the electronic device on which the distance measuring device of the present disclosure can be mounted (electronic device of the present disclosure).

Figure 23A:
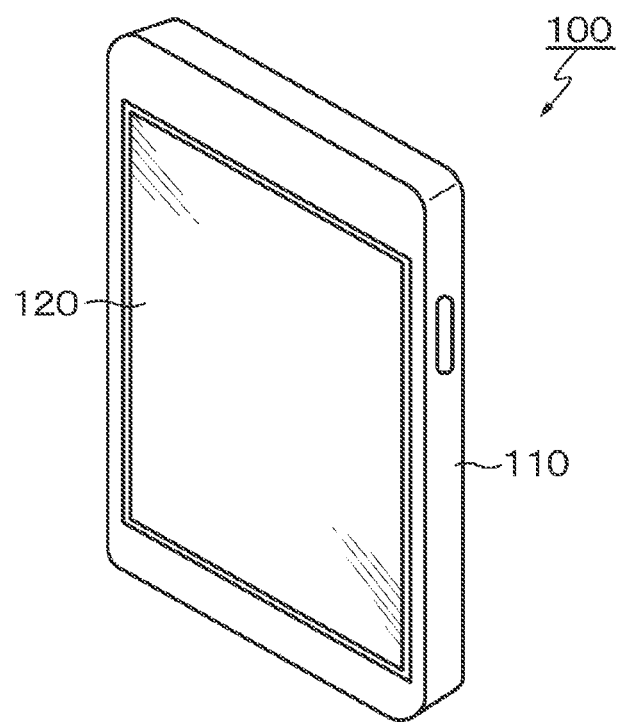
FIG. 23A is an external view of a smartphone according to a specific example of an electronic device of the present disclosure as viewed from a front side.
Figure 23B:
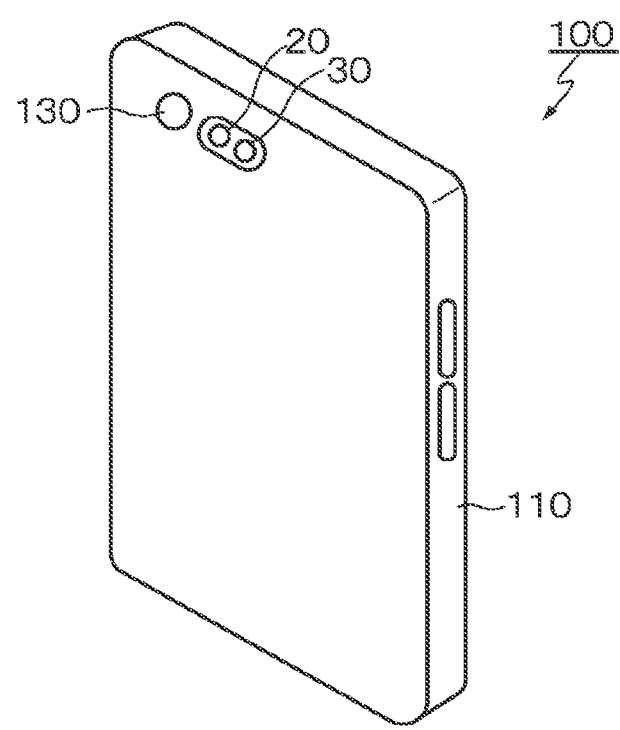
FIG. 23B is an external view thereof as viewed from a back side.

FIG. 23A shows an external view of a smartphone according to a specific example of the electronic device of the present disclosure as viewed from a front side, and FIG. 23B shows an external view thereof as viewed from a back side. A smartphone 100 according to the present specific example includes a display unit 120 on a front side of a housing 110. Furthermore, the smartphone 100 includes, for example, an imaging unit 130 in an upper portion on a back side of the housing 110.

The distance measuring device 1 according to the first embodiment or the second embodiment of the present disclosure described above can be used by being mounted on, for example, the smartphone 100 which is an example of a mobile device having the above configuration. In this case, the light source 20 and the light detection unit 30 of the distance measuring device 1 can be disposed in the vicinity of the imaging unit 130, for example, as illustrated in FIG. 23B. However, an arrangement example of the light source 20 and the light detection unit 30 illustrated in FIG. 23B is an example, and is not limited to this arrangement example.

As described above, the smartphone 100 according to the present specific example is manufactured by mounting the distance measuring device 1 according to the first embodiment or the second embodiment of the present disclosure. Then, by mounting the distance measuring device 1 described above, the smartphone 100 according to the present specific example can acquire a good distance image (depth map) over a wider section of a distance measuring range, and can accurately measure a distance to a subject which is a distance measuring object, even in an environment where a subject which is not the distance measuring object exists at a short distance in which scattered light occurs.

<Configuration that can be Taken by the Present Disclosure>

Note that the present disclosure can have the following configurations.

<<A. Distance Measuring Device>>

[A-1] A distance measuring device including:
a light source that irradiates a subject with light;
a light detection unit that receives reflected light from the subject based on irradiation light from the light source; and
a control unit that performs exposure control according to a distance between the distance measuring device and the subject.

[A-2] The distance measuring device according to [A-1] described above,
in which the control unit performs the exposure control on the basis of a signal value output from the light detection unit.

[A-3] The distance measuring device according to [A-2] described above,
in which the control unit controls light emission/exposure conditions of a next frame on the basis of imaging data and light emission/exposure conditions of a current frame output from the light detection unit.

[A-4] The distance measuring device according to [A-3] described above,
in which the control unit performs the exposure control so as to maintain a designated first confidence value in control of a relatively distant view.

[A-5] The distance measuring device according to [A-3] described above,
in which the control unit performs the exposure control so as to maintain a designated exposure time in control of a relatively near view.

[A-6] The distance measuring device according to [A-4] or [A-5] described above,
in which the control unit separates an ambient light component incident on the light detection unit and a reflected light component from the subject, and controls the reflected light component.

[A-7] The distance measuring device according to [A-6] described above,
in which the control unit estimates the ambient light component on the basis of image data output from a light detector, and separates the reflected light component and the ambient light component.

[A-8] The distance measuring device according to [A-2] described above,
in which the control unit adaptively controls a noise amount of a reflected light component with reference to the signal value output from the light detection unit.

[A-9] The distance measuring device according to any one of [A-1] to [A-8] described above, further including
a distance measuring unit that performs processing of acquiring distance image information by using image data of a current frame including distance information detected for each pixel of the light detection unit.

[A-10] The distance measuring device according to [A-3] described above,
in which the control unit performs the exposure control so as to maintain a designated second confidence value in control of a relatively ultra-near view.

[A-11] The distance measuring device according to [A-10] described above,
in which in the ultra-near view, a distance to the subject is set to a short distance that influence of scattered light occurs due to existence of a subject which is not a distance measuring object.

<<B. Electronic Device>>

[B-1] An electronic device having a distance measuring device including:
a light source that irradiates a subject with light;
a light detection unit that receives reflected light from the subject based on irradiation light from the light source; and
a control unit that performs exposure control according to a distance between the distance measuring device and the subject.

[B-2] The electronic device according to [B-1] described above,
in which the control unit performs the exposure control on the basis of a signal value output from the light detection unit.

[B-3] The electronic device according to [B-2] described above,
in which the control unit controls light emission/exposure conditions of a next frame on the basis of imaging data and light emission/exposure conditions of a current frame output from the light detection unit.

[B-4] The electronic device according to [B-3] described above,
in which the control unit performs the exposure control so as to maintain a designated first confidence value in control of a relatively distant view.

[B-5] The electronic device according to [B-3] described above, in which the control unit performs the exposure control so as to maintain a designated exposure time in control of a relatively near view.

[B-6] The electronic device according to [B-4] or [B-5] described above, in which the control unit separates an ambient light component incident on the light detection unit and a reflected light component from the subject, and controls the reflected light component.

[B-7] The electronic device according to [B-6] described above, in which the control unit estimates the ambient light component on the basis of image data output from a light detector, and separates the reflected light component and the ambient light component.

[B-8] The electronic device according to [B-2] described above, in which the control unit adaptively controls a noise amount of a reflected light component with reference to the signal value output from the light detection unit.

[B-9] The electronic device according to any one of [B-1] to [B-8] described above, further including a distance measuring unit that performs processing of acquiring distance image information by using image data of a current frame including distance information detected for each pixel of the light detection unit.

[B-10] The electronic device according to [B-3] described above, in which the control unit performs the exposure control so as to maintain a designated second confidence value in control of a relatively ultra-near view.

[B-11] The electronic device according to [B-10] described above, in which in the ultra-near view, a distance to the subject is set to a short distance that influence of scattered light occurs due to existence of a subject which is not a distance measuring object.

REFERENCE SIGNS LIST

1 Distance measuring device
10 Subject (measuring object)
20 Light source
30 Light detection unit
40 AE control unit
41 Next frame light emission/exposure condition calculation unit
42 Next frame light emission/exposure control unit
50 Distance measuring unit
51 Distance image calculation unit

The invention claimed is:

1. A distance measuring device, comprising:
a light source configured to irradiate a first subject with light;
a light detection unit configured to:
  receive reflected light from the first subject based on the irradiation of the first subject with the light;
  output a signal value based on an exposure time of the light detection unit and reflectance of the first subject; and
  detect a distance between the distance measuring device and the first subject based on the reflected light; and
a control unit configured to:
  perform exposure control of the light source based on the output signal value and the detected distance.

2. The distance measuring device according to claim 1, wherein
the light detection unit is further configured to output first light emission conditions or first light exposure conditions of a first frame,
the control unit is further configured to control second light emission conditions or second light exposure conditions of a second frame based on
imaging data, and
the first light emission conditions or the first light exposure conditions of the first frame,
the second frame is subsequent to the first frame, and
each of the first frame and the second frame is associated with the imaging data.

3. The distance measuring device according to claim 2, wherein
the control unit is further configured to perform the exposure control of the light source to maintain a first confidence value, and
the first confidence value corresponds to a first amount of the reflected light, in a case where the distance between the distance measuring device and the first subject is more than a first threshold value.

4. The distance measuring device according to claim 3, wherein
the control unit is further configured to perform the exposure control of the light source to maintain a designated exposure time of the light detection unit, in the case where the distance between the distance measuring device and the first subject is less than the first threshold value.

5. The distance measuring device according to claim 3, wherein the control unit is further configured to:
separate the reflected light into an ambient light component and an active light component; and
control the active light component.

6. The distance measuring device according to claim 5, wherein the control unit is further configured to estimate the ambient light component based on of the imaging.

7. The distance measuring device according to claim 1, wherein
the reflected light includes an ambient light component, and
the control unit is further configured to adaptively control a noise amount of the ambient light component, based on the output signal value.

8. The distance measuring device according to claim 1, wherein
the light detection unit includes a pixel array, and
the light detection unit is further configured to detect the distance for each pixel of the pixel array.

9. The distance measuring device according to claim 4, wherein
the control unit is further configured to perform the exposure control of the light source to maintain a second confidence value,
the second confidence value corresponds to a second amount of the reflected light in a case where the distance between the distance measuring device and the first subject is less than a second threshold value, and
the second threshold value is smaller than the first threshold value.

10. The distance measuring device according to claim 9, wherein
the control unit is further configured to set the distance, as a specific distance, in a case a second subject exits between the distance measuring device and the first subject,
an influence of scattered light occurs due to the existence of the second subject, and
the second subject is different from the first subject.

11. A method, comprising:
in a distance measuring device including:
irradiating, by a light source of the distance measuring device, a subject with light;
receiving, by a light detection unit of the distance measuring device, reflected light from the subject based on the irradiation of the subject with the light;
outputting, by the light detection unit, a signal value based on exposure time of the light detection unit and reflectance of the subject;
detecting, by a control unit of the distance measuring device, a distance between the distance measuring device and the subject; and
performing, by the control unit, exposure control of the light source based on the output signal value and the detected distance.

12. An electronic device, comprising:
a distance measuring device that includes:
a light source configured to irradiate a subject with light;
a light detection unit configured to:
receive reflected light from the subject based on the irradiation of the subject with the light; and
output a signal value based on an exposure time of the light detection unit and reflectance of the subject; and
a control unit configured to:
detect a distance between the distance measuring device and the subject; and
perform exposure control of the light source based on the output signal value and the detected distance.

* * * * *